(12) United States Patent
Malik et al.

(10) Patent No.: US 7,545,791 B2
(45) Date of Patent: Jun. 9, 2009

(54) WIRELESS TRANSMISSION APPARATUS AND WIRELESS TRANSMISSION METHOD

(75) Inventors: Rahul Malik, Singapore (SG); Pek Yew Tan, Singapore (SG); Daichi Imamura, Kanagawa (JP); Katsuyoshi Naka, Kanagawa (JP)

(73) Assignee: Panaosnic Corporation, Osaka (JP)

( * ) Notice: Subject to any disclaimer, the term of this patent is extended or adjusted under 35 U.S.C. 154(b) by 258 days.

(21) Appl. No.: 10/584,495

(22) PCT Filed: Dec. 20, 2004

(86) PCT No.: PCT/JP2004/019015

§ 371 (c)(1),
(2), (4) Date: Jul. 11, 2006

(87) PCT Pub. No.: WO2005/064835

PCT Pub. Date: Jul. 14, 2005

(65) Prior Publication Data
US 2007/0165521 A1  Jul. 19, 2007

(30) Foreign Application Priority Data
Dec. 26, 2003  (JP)  ............................. 2003-433897

(51) Int. Cl.
*H04J 1/00*   (2006.01)
(52) U.S. Cl. .................. 370/343; 370/328; 370/338; 455/7; 455/403; 455/424
(58) Field of Classification Search .............. 370/343, 370/328, 338; 455/403, 424, 7
See application file for complete search history.

(56) References Cited

U.S. PATENT DOCUMENTS

| | | | |
|---|---|---|---|
| 6,917,311 B2 * | 7/2005 | Hosur et al. .................. 341/50 |
| 2003/0064752 A1 | 4/2003 | Adachi et al. |
| 2004/0071078 A1 | 4/2004 | Sudo |

FOREIGN PATENT DOCUMENTS

| | | |
|---|---|---|
| JP | 2003 179611 | 6/2003 |
| JP | 2003 264524 | 9/2003 |
| JP | 2003 304218 | 10/2003 |

(Continued)

OTHER PUBLICATIONS

Japanese Office Action dated Jan. 4, 2007 with English translation.

(Continued)

*Primary Examiner*—Nghi H Ly
(74) *Attorney, Agent, or Firm*—Dickinson Wright, PLLC

(57) ABSTRACT

A wireless transmission apparatus that improves throughput in a wireless communication network system. In this apparatus, $M_T$ units of transmission/reception sections (122-1 to 122-$M_T$) respectively correspond to $M_T$ units of antennas (121-1 to 121-$M_T$) and transmit a preamble signal and a data signal via corresponding antennas (121-1 to 121-$M_T$). $M_T$ units of transmission/reception sections (122-1 to 122-$M_T$) use subcarriers allocated per antennas (121-1 to 121-$M_T$) out of subcarriers (141, 142, 143 and 144) in preamble signal transmission. Furthermore, $M_T$ units of transmission/reception section (122-1 to 122-$M_T$) use a subcarrier (140) having a frequency different from subcarriers (141, 142, 143 and 144) in data signal transmission.

16 Claims, 16 Drawing Sheets

FOREIGN PATENT DOCUMENTS

| | | |
|---|---|---|
| JP | 2003 530010 | 10/2003 |
| JP | 2003 348045 | 12/2003 |
| WO | 0176110 | 10/2001 |

OTHER PUBLICATIONS

PCT International Search Report dated Mar. 29, 2005.

Local and Metropolitan Area Networks-Specific Requirements-Part II: Wireless LAN Medium Access Control (MAC) and Physical Layer (PHY) Specifications, ANSI/IEEE 802.11, 1999 Edition, Aug. 1999, pp. 1-528.

Local and Metropolitan Area Network Area Networks-Specific Requirements-Part II: Wireless LAN Medium Access Control (MAC) and Physical Layer (PHY) Specifications: Higher-Speed Physical Layer Extension in the 2.4 GHz Band, IEEE Std. 802.11b-1999, Sep. 1999, pp. 1-89.

Local and Metropolitan Area Networks-Specific Requirements-Part II: Wireless LAN Medium Access Control (MAC) and Physical Layer (PHY) Specifications: High-Speed Physical Layer in the 5 GHz Band, IEEE Std. 802.11a-1999, Sep. 1999, pp. 1-14.

J. Rosdahl, et al.; "Draft PAR for High Throughout Study Group," doc.: IEEE802.11-02/798r7, Mar. 2003, pp. 1-9.

PCT International Search Report dated Mar. 29, 2005.

P. Zetterberg, et al.; "Performance of Multiple-Receive Multiple-Transmit Beamforming in WLAN-type Systems under Power of EIRP Constraints with Delayed Channel Estimates," In: Vehicular Technology Conference Spring 2002 IEEE 55th, May 9, 2002, vol. 4, pp. 1906-1910.

T. Nishimura, et al.; "MIMO Channel deno SDMA Kudari Kaisen Beam-gata Seiho," Teh Institute of Electronics, Information and Communication Engineers Gijutsu Kenkyu Hokoku, Oct. 13, 2001, vol. 101, No. 371, pp. 23-30.

Local and Metropolitan Area Networks-Specific Requirements-Part II: Wireless LAN Medium Access Control (MAC) and Physical Layer (PHY) Specifications: ANSI/IEEE 802.11, 1999 Edition, Aug. 1999, pp. 1-528.

Local and Metropolitan Area Networks-Specific Requirements-Part II: Wireless LAN Medium Access Control (MAC) and Physical Layer (PHY) Specifications: Higher-Speed Physical Layer Extension in the 2.4 GHz Band, IEEE Std. 802.11b-1999, Sep. 1999, pp. 1-89.

Local and Metropolitan Area Networks-Specific Requirements-Part II: Wireless LAN Medium Access Control (MAC) and Physical Layer (PHY) Specifications: High-Speed Physical Layer in the 5 GHz Band, IEEE Std. 802.11a-1999, Sep. 1999, pp. 1-14.

J. Rosdahl, et al.: "Draft PAR for High Throughout Study Group," doc.: IEEE802.11-02/798r7, Mar. 2003, pp. 1-9.

* cited by examiner

WIRELESS TRANSMISSION APPARATUS AND WIRELESS TRANSMISSION METHOD

TECHNICAL FIELD

The present invention relates to a wireless transmission apparatus and wireless transmission method used in a wireless communication network system such as wireless LAN (Local Area Network).

BACKGROUND ART

IEEE802.11 provides a cost-effective solution for networking terminal apparatus including for example computers by wireless. With new developments in signal processing and modulation technologies, the standard has been enhanced to support physical layers with higher data rates in the present wireless transmission apparatus used in wireless LAN (see, for example, Non-Patent Document 1 and Non-Patent Document 2).

Non-Patent Document 1: "Local and Metropolitan Area Networks—Specific Requirement—Part 11: Wireless LAN Medium Access Control (MAC) and Physical Layer (PHY) specifications: Higher-Speed Physical Layer Extension in the 2.4 GHz Band", IEEE Standard 802.11b-1999, IEEE, September 1999.

Non-Patent Document 2: "Local and Metropolitan Area Networks—Specific Requirement—Part 11: Wireless LAN Medium Access Control (MAC) and Physical Layer (PHY) specifications: Higher-Speed Physical Layer Extension in the 5 GHz Band", IEEE Standard 802.11a-1999, IEEE, September 1999.

DISCLOSURE OF INVENTION

Problems to be Solved by the Invention

However, in the conventional wireless transmission apparatus, though high-speed data rate is realized with new developments in signal processing and modulation technologies, there is a demand for further improvement of throughput in wireless LAN. As described in "Draft Project Allocation Request (PAR) for High Throughput Study Group" (IEEE 802.11/02-798r7, Rosdahl, J., et al, March 2003), the IEEE802.11 working group has identified the need for high-throughput wireless LAN based on improvement of both MAC (Media Access Control) layers and PHY (Physical) layers for the conventional wireless LAN.

As a solution to realize high-throughput wireless LAN, for example, it is expected to adopt a MIMO scheme. The MIMO scheme is a scheme for simultaneously transmitting signals independent from each other in the same frequency band using a plurality of antennas in both transmission and reception and is subject of attention as a technology for increasing transmission capacity and improving throughput.

By the way, wireless LAN is traditionally a wireless communication network system where a time division multiple access scheme has been adopted. That is, in general, only one wireless transmission apparatus (for example, a mobile terminal apparatus) can transmit data to a wireless reception apparatus (for example, access points) at a given instantaneous timing. Therefore, the effect expected by adopting the MIMO scheme is basically to realize a high-speed data rate, reduce the time during which a medium is occupied by one wireless transmission apparatus, and, as a result, improve overall system throughput.

However, the amount of data transmission that can be performed between a wireless transmission apparatus and a wireless reception apparatus simultaneously in parallel is decided by the number of antennas in the apparatus provided with fewer antennas. For example, even if an access point is provided with many antennas, not all mobile communication terminal apparatus performing data transmission to the access point may be provided with many antennas. Therefore, there is a certain limitation to improvement of throughput only by adopting the conventional MIMO scheme to the conventional wireless LAN.

It is therefore an object of the present invention to provide a wireless transmission apparatus and wireless transmission method that can improve throughput in a wireless communication network system.

Means for Solving the Problem

The wireless transmission apparatus of the present invention adopts a configuration having at least one transmission antenna; and a transmission section that transmits a preamble signal and a data signal via the at least one transmission antenna, and, in this apparatus, the transmission section uses a preamble subcarrier allocated per transmission antenna to transmit the preamble signal and uses a data subcarrier having a frequency different from the preamble subcarrier to transmit the data signal.

The wireless transmission method of the present invention has a transmission step of transmitting a preamble signal and a data signal via at least one transmission antenna, and, in this method, the transmission step includes a preamble transmission step of transmitting the preamble signal using a preamble subcarrier allocated per transmission antenna; and a data transmission step of transmitting the data signal using a data subcarrier having a frequency different from the preamble subcarrier.

Advantageous Effect of the Invention

According to the present invention, it is possible to improve throughput in a wireless communication network system.

BEST MODE FOR CARRYING OUT THE INVENTION

Embodiments of the present invention will be described below in detail with reference to the accompanying drawings.

EMBODIMENT 1

Figure 1:
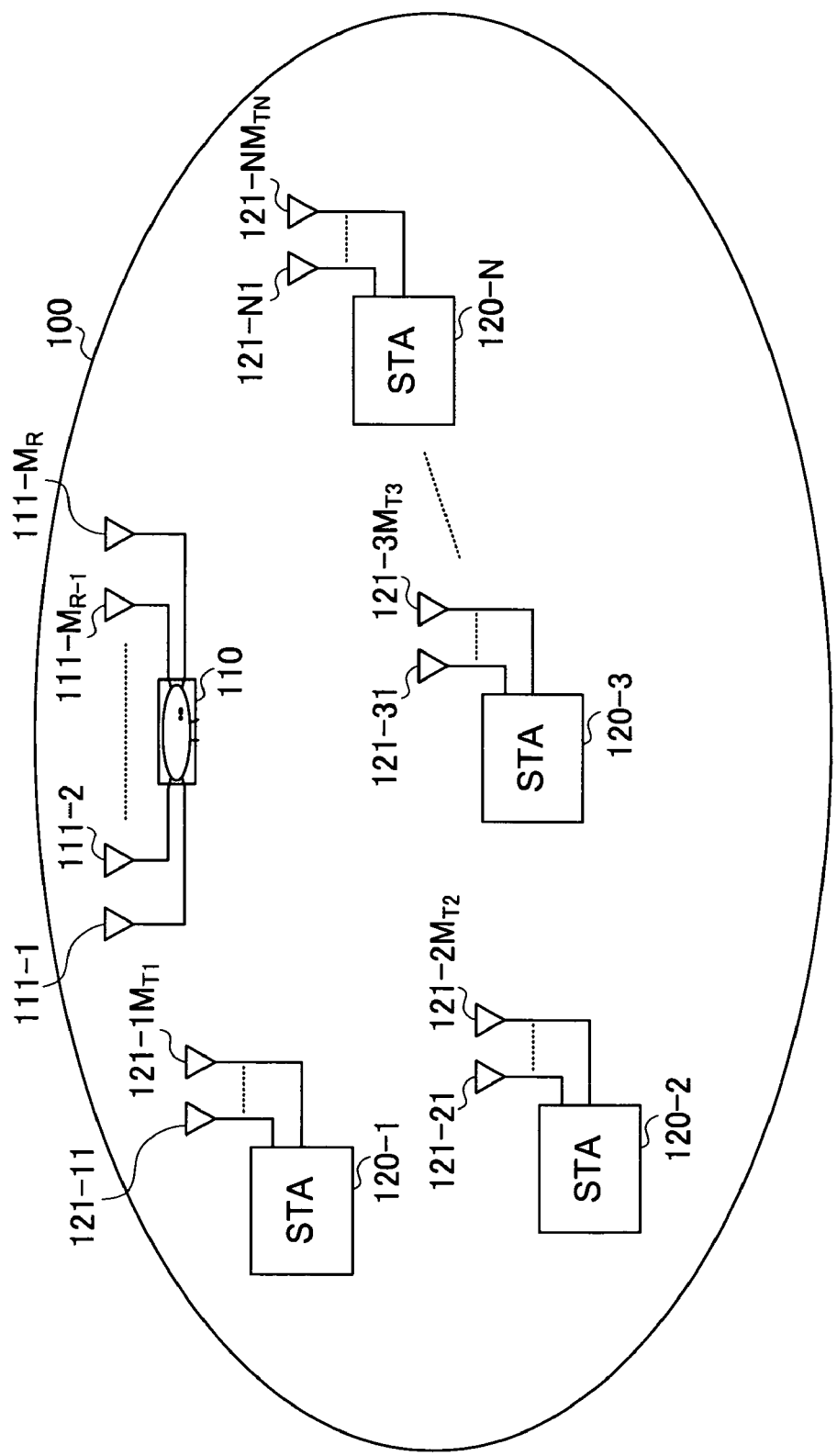
FIG. 1 is a configuration diagram showing an example of a wireless LAN using a wireless transmission apparatus according to Embodiment 1 of the present invention.

FIG. 1 is a configuration diagram showing an example wireless LAN using the wireless transmission apparatus according to Embodiment 1 of the present invention. In wireless LAN 100 shown in FIG. 1, the wireless transmission apparatus according to Embodiment 1 of the present invention is used as a mobile terminal apparatus (STA) and N units of STAs 120-1, 120-2, . . . , 120-N are distributed and movably located within the area of wireless LAN 100. Furthermore, these STAs 120-1 to 120-N perform wireless communication with access point (AP) 110 and perform data transmission to AP 110. In FIG. 1, STAs 120-1 to 120-N are wireless transmission apparatuses and AP 110 is a wireless reception apparatus. Generally, AP 110 also has functions as a wireless transmission apparatus and STAs 120-1 to 120-N also have functions as wireless reception apparatuses, but the explanation of these cases will be omitted in this embodiment. In addition, one or more arbitrary STAs out of STAs 120-1 to 120-N are referred to as "STA 120."

AP 110 has $M_R$ units of antennas 111-1, 111-2, . . . , 111-$M_{R-1}$, 111-$M_R$ receiving signals transmitted from STA 120 located within the area of wireless LAN 100.

N units of STAs 120 have $M_{TN}$ units of antennas 121-11 to 121-1$M_{T1}$, . . . , 121-N1 to 121-N$M_{TN}$ that can simultaneously transmit signals independent from each other in the same frequency band. In addition, when STA 120 is referred to, $M_{TN}$ units of antennas that STA 120 has are referred to as "antennas 121-1 to 121-$M_T$."

In wireless LAN 100 shown in FIG. 1, in order to more reliably realize advantages of spatial multiplexing, it is preferable that the relationship expressed in the following (Equation 1) is established between the number of antennas of AP 110 $M_R$ and each number of antennas of N units of STAs 120-1 to 120-N $M_{TN}$. In addition, in (Equation 1), $(M_T)_i$ is the total number of sub-streams, that is, the number of transmit chains (transmission antennas) simultaneously used by all STAs.

[Equation 1]

$$M_R \geq \sum_{\forall i} [(M_T)_i] \qquad (1)$$

Figure 2:
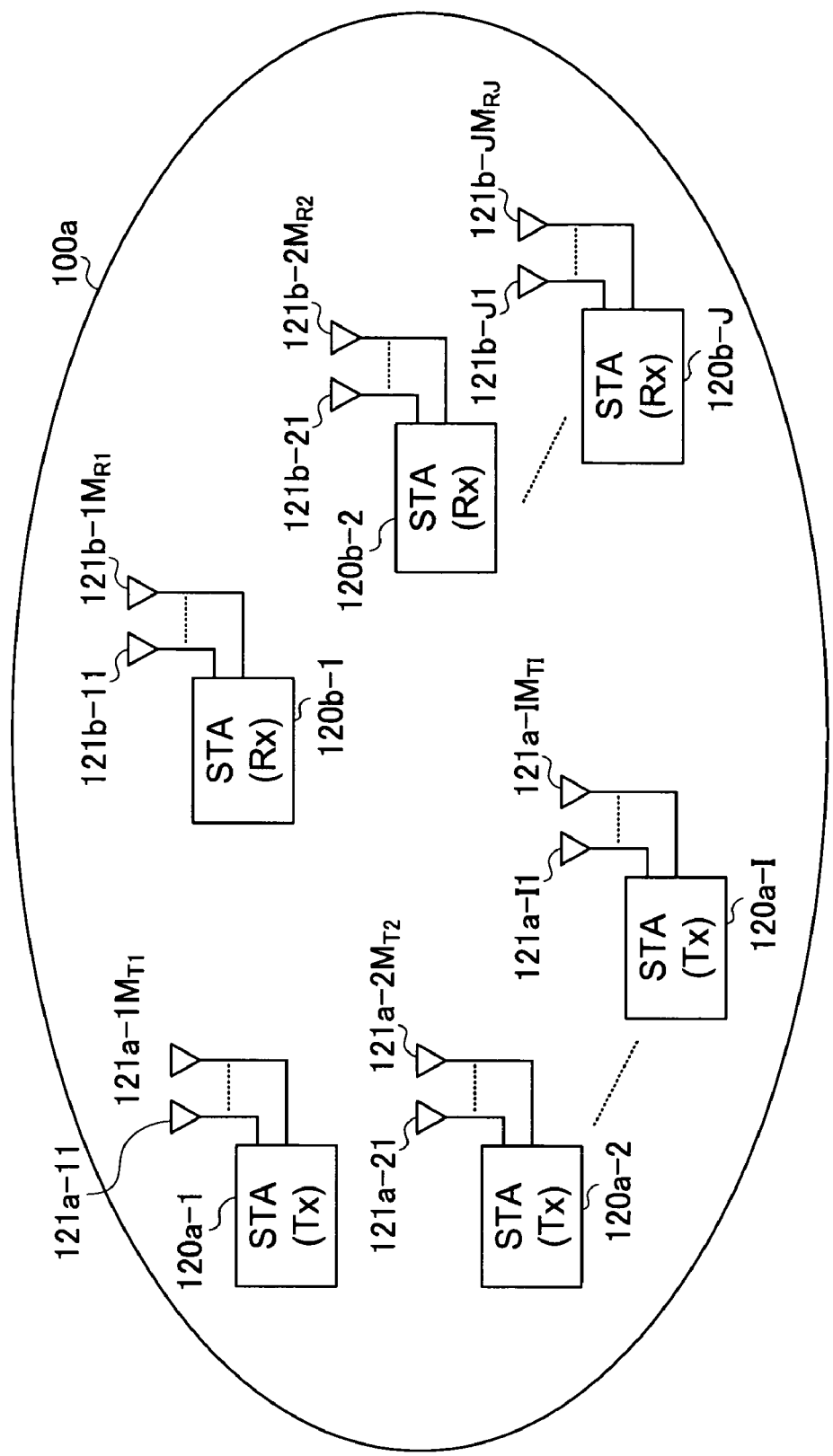
FIG. 2 is a configuration diagram showing another example of the wireless LAN using the wireless transmission apparatus according to this embodiment.

This embodiment will be explained in detail using wireless LAN 100 shown in FIG. 1 as an example, but the configuration of wireless LAN using the wireless transmission apparatus according to Embodiment 1 of the present invention is not limited to the above one. FIG. 2 is a configuration diagram showing another example of wireless LAN using the wireless transmission apparatus according to Embodiment 1 of the present invention.

In wireless LAN 100a shown in FIG. 2, the wireless transmission apparatus according to Embodiment 1 of the present invention is used as STA and (I+J) units of STAs 120a-1, . . . , 120a-I, 120b-1, . . . , 120b-J are distributed and movably located within the area of wireless LAN 100a. Furthermore, these STAs 120a-1 to 120a-I, 120b-1 to 120b-J perform wireless communication with each other. That is, wireless LAN 100a is an adhoc wireless communication network system. As shown in FIG. 2, these STAs 120a-1 to 120a-I, 120b-1 to 120b-J are divided into two groups. I units of STAs 120a-1 to 120a-I constitute a transmission group, and J units of STAs 120b-1 to 120b-J constitute a reception group, where data transmission is performed from the transmission group to the reception group. It is obvious that the configurations of the transmission group and the reception group are not limited to the above ones.

Furthermore, the condition indicated in (Equation 1) can be generalized as follows. That is, this condition requires that the total number of $(M_T)_i$ be smaller than the minimum number of receive chains (reception antennas) used by STA 120b-j (j:1 to J) that is a reception STA, and this condition is summarized in the following (Equation 2).

[Equation 2]

$$\forall j, \min_j [(M_R)_j] \geq \sum_i [(M_T)_i] \qquad (2)$$

Figure 3:
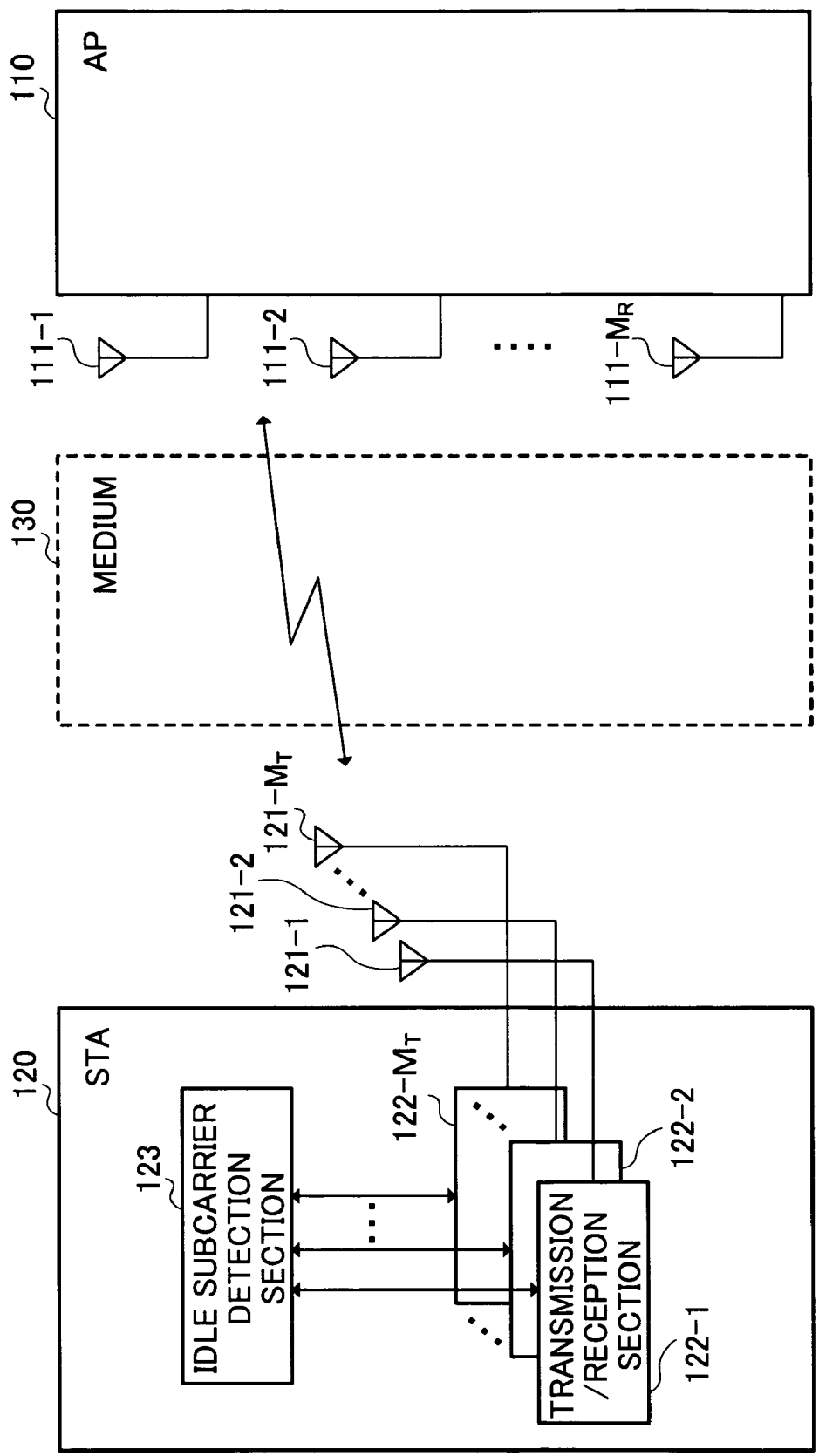
FIG. 3 is a block diagram showing an internal configuration of the wireless transmission apparatus according to this embodiment.

FIG. 3 is a block diagram showing an internal configuration of STA 120. STA 120 shown in FIG. 3 has $M_T$ units of antennas 121-1 to 121-$M_T$, and transmission/reception sections 122-1 to 122-$M_T$ that respectively correspond to $M_T$ units of antennas 121-1 to 121-$M_T$ and perform predetermined processing on data signal inputted from upper layer entity and perform wireless transmission, and idle subcarrier detection section 123 that detects idle subcarriers in communication frequency band used in wireless communication with AP 110 via medium 130. $M_T$ units of antennas 121-1 to 121-$M_T$, and transmission/reception sections 122-1 to 122-$M_T$ that respectively correspond to $M_T$ units of antennas 121-1 to 121-$M_T$ and perform predetermined processing on data signal inputted from upper layer entity and perform wireless transmission, constitute $M_T$ units of transmit chains and $M_T$ units of receive chains. The detail of the operation of each component will be described later.

Next, the operation of STA 120 having the above configuration will be explained.

Figure 4:
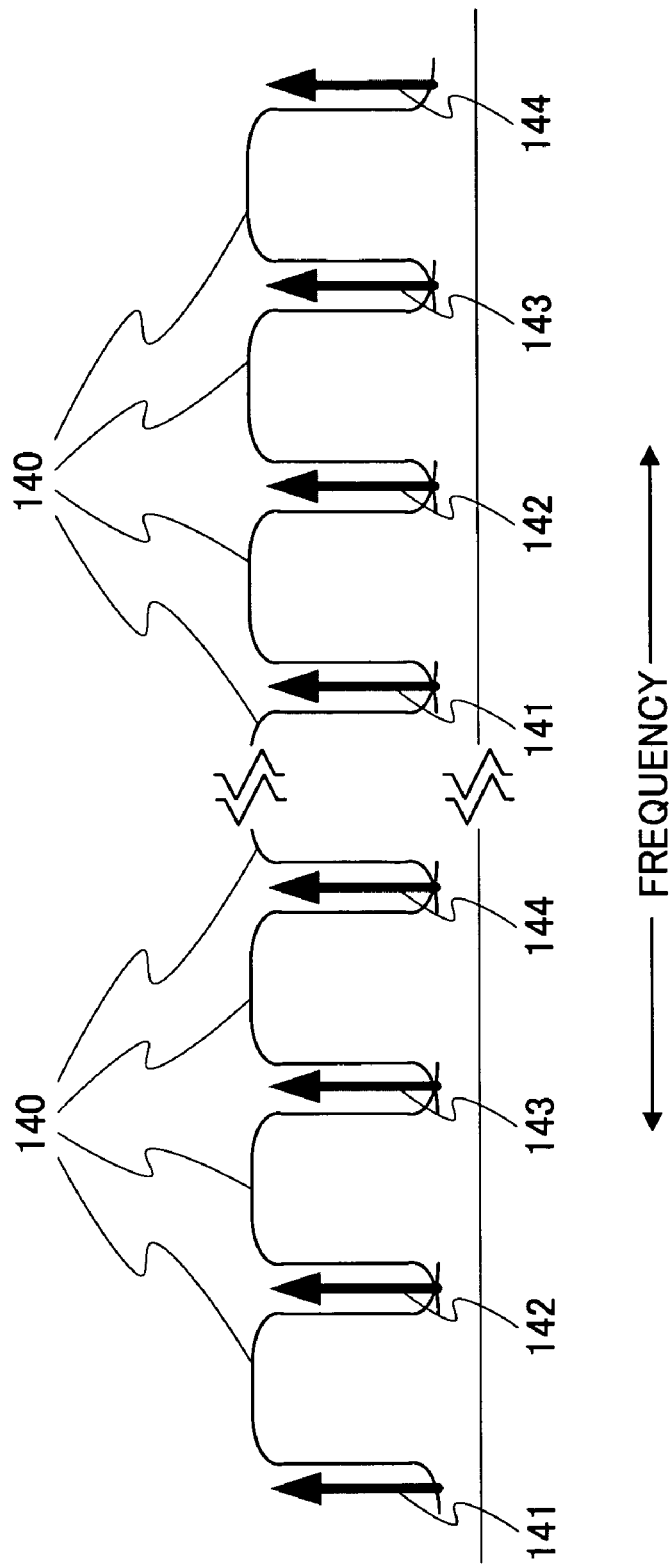
FIG. 4 illustrates frequency band allocation in the wireless LAN of this embodiment.

FIG. 4 illustrates frequency band allocation in wireless LAN 100 of this embodiment.

In order to implement wireless LAN 100 as a high-throughput wireless communication network system, it is necessary for a plurality of STAs 120 to simultaneously access medium 130 and perform data transmission to AP 110 simultaneously in parallel. In order to perform parallel transmission of data signal to AP 110, it is essential to maintain orthogonality between preamble signals and between signature signals transmitted from STA 120 to AP 110 and overcome the problem of asynchronism.

A preamble signal is transmitted before the data signal is transmitted and is required when predetermined reception control processing including channel estimation and synchronization, is performed at AP 110, and is a known signal having predetermined sequence code. In this way, by transmitting the preamble signal before the transmission of the data signal, it is possible for AP 110 to perform the above reception control processing, for example, when STA 120-1 participates in the parallel transmission of the data signal to AP 110. That is, even in the case where, for example, STA 120-1 participates in the parallel transmission of the data signal under the condition that STA 120-2 has already transmitted the data signal to AP 110, AP 110 can perform the above reception control processing individually.

Furthermore, a signature signal is a signal for signaling to other apparatus that the apparatus that is a transmitter of the data signal is in the process of the data signal transmission and is a known signal having predetermined sequence code for facilitating channel estimation and maintaining synchronization at AP 110.

As one of the methods for achieving maintenance of orthogonality between signals, subcarriers are individually allocated to transmit chains performing data transmission to AP 110.

In the band allocation shown in FIG. 4, subcarriers that can be used in preamble signal transmission and signature signal transmission are divided into a plurality of subcarrier groups. In this embodiment, AP 110 is assumed to have four receive chains (antennas), and subcarriers that can be used in signature signal transmission (in this embodiment, as well as preamble signal transmission) are divided into four subcarrier groups. That is, in FIG. 4, two subcarriers 141 belong to A group, two subcarriers 142 belong to B group, two subcarriers 143 belong to C group, and two subcarriers 144 belong to D group. In this way, it is preferable that the subcarrier groups each include the same number of subcarriers.

These subcarriers 141, 142, 143 and 144 have frequencies different from each other. A plurality of subcarriers 140 for data signal transmission are located in the bands between these subcarriers 141, 142, 143 and 144. A plurality of subcarriers 140 constitute one subcarrier cluster. In this way, frequencies 141, 142, 143 and 144 of subcarriers used in preamble signal transmission and signature signal transmission are distributed in frequency band used in wireless communication, thereby, for example, making it possible to improve accuracy of processing such as channel estimation at AP 110.

In addition, frequency band allocation, including the number of groups, the number of subcarriers per group, and intervals between groups and so forth, is set so as to be compatible with the frequency bandwidth and dynamic state of a channel and capabilities of a transmission/reception apparatus. Furthermore, AP 110 may report the frequency band allocation to all STAs 120 using, for example, a beacon, but in this embodiment, it is assumed that all STAs 120 acquire information on the frequency band allocation by a certain method in advance. Furthermore, in this embodiment, it is assumed that STA 120-1 has one transmit chain, STA 120-2 has one transmit chain, STA 120-3 has two transmit chains, STA 120-4 has two transmit chains, and AP 110 has four receive chains.

APs provided with a plurality of antennas 111-1 to 111-$M_R$ like AP 110 conventionally exist, to improve reception quality by introducing space diversity reception. However, current general wireless LANs mainly adopt SISO (Single Input Single Output) scheme. On the other hand, in MIMO scheme which is expected to be adopted in future wireless LAN, in order to perform high-accuracy demodulation and decoding on a received signal, it is necessary for a reception apparatus to estimate channels from individual antennas and generate one channel matrix.

Conceptually, it is required that training sequence codes constituting, for example, the preamble signals transmitted to different antennas be orthogonal in at least one dimension. In MIMO transmission performing point-to-point transmission, all transmission antennas physically exist in substantially the same location (for example, one transmission apparatus), and therefore it is easy to obtain synchronization and realize orthogonality. In response, under the condition that transmission apparatus are dispersed within a wireless LAN, it is not easy to maintain orthogonality of training sequence codes in the time domain, and the present invention has been reached with focus on this point.

Figure 5:
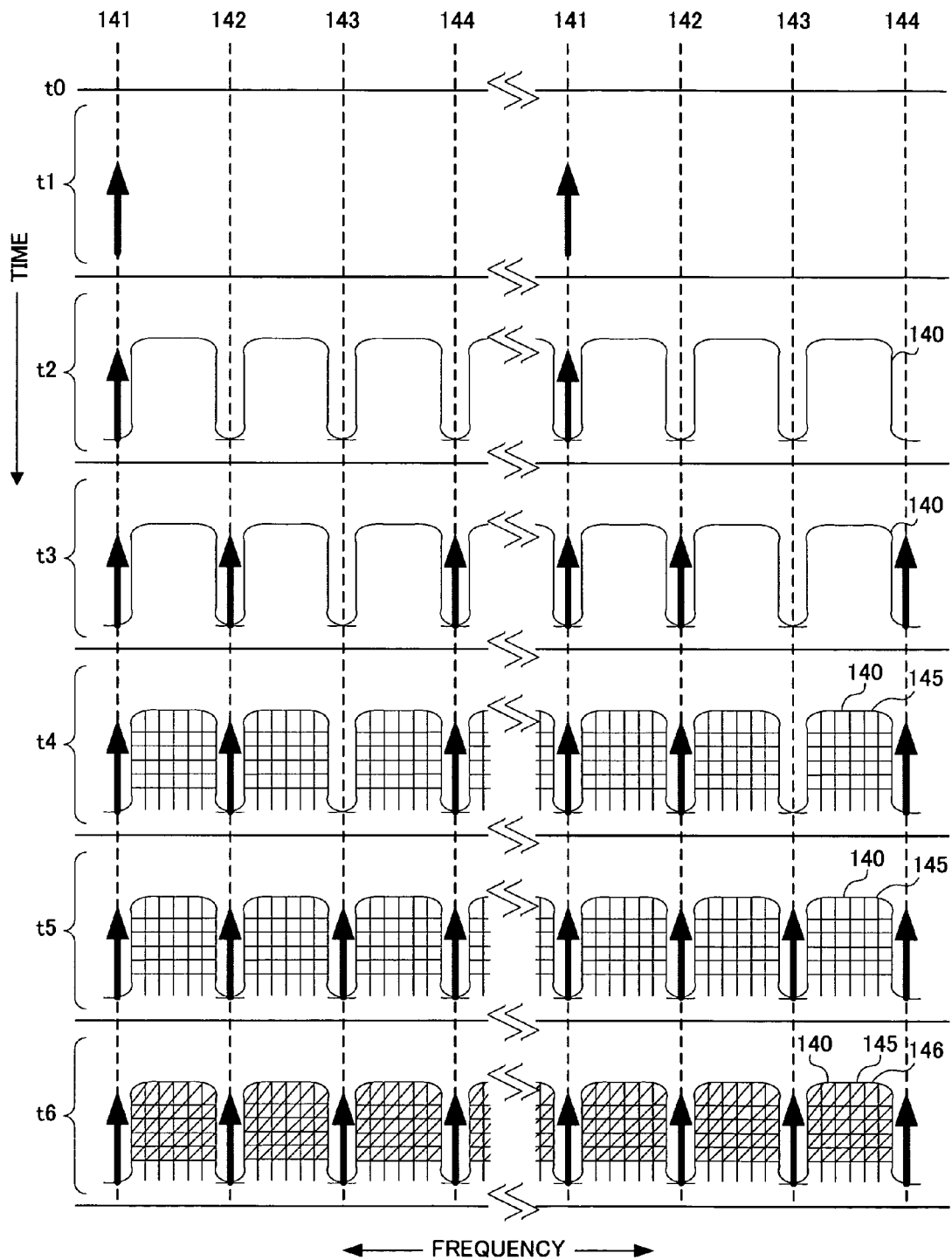
FIG. 5 is a diagram illustrating the operation of the wireless transmission apparatus according to this embodiment based on the frequency band allocation shown in FIG. 4, from the viewpoint of the frequency of subcarriers used.
Figure 6:
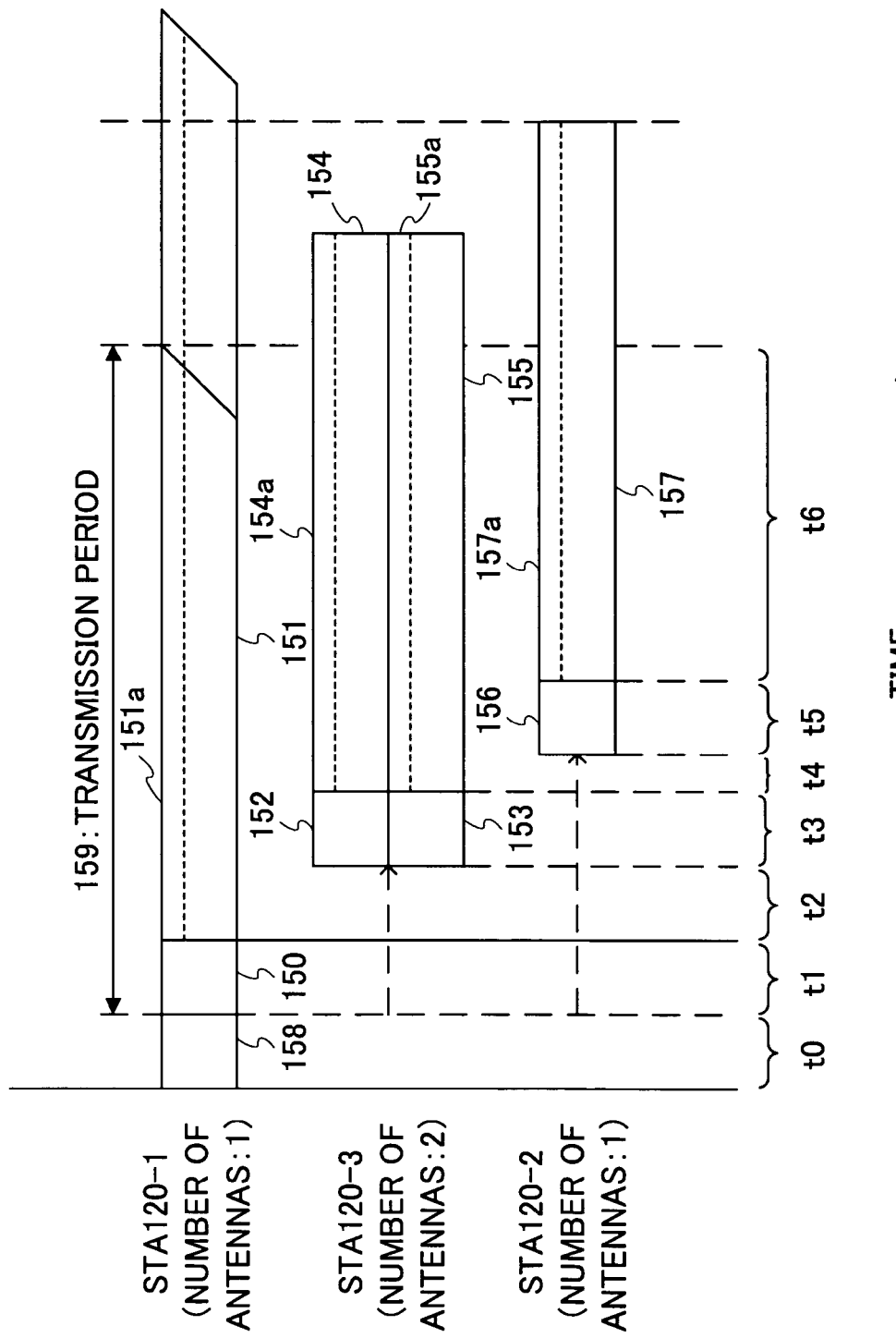
FIG. 6 is a diagram illustrating the operation of the wireless transmission apparatus according to this embodiment based on the frequency band allocation shown in FIG. 4, from the viewpoint of the time of subcarriers used.

FIG. 5 and FIG. 6 are diagrams illustrating the operation of STA 120 based on the frequency band allocation shown in FIG. 4, and FIG. 5 is a diagram illustrating the operation seen from the viewpoint of the frequency of subcarriers used, and FIG. 6 is a diagram illustrating the operation seen from the viewpoint of the time subcarriers are used.

First, at time t0, when STA 120-1 confirms that medium 130 is idle, STA 120-1 transmits preamble signal 150 using two subcarriers 141 in period t1. That is, one transmit chain (for example, antenna 121-11) of STA 120-1 is associated with group A. On the other hand, only subcarrier 141 is detected at AP 110, and therefore it can be determined that data transmission is performed from one transmit chain.

After the transmission of preamble signal 150 is completed, in period t2, STA 120-1 transmits data signal 151 using a plurality of subcarriers 140. Furthermore, in period t2, STA 120-1 subsequently transmits signature signal 151*a* using two subcarriers 141. By this means, it is possible to signal, to other STAs 120, that subcarrier 141 of group A is busy, that is, STA 120-1 transmits using one transmit chain—or, in still other words, one of four available receive chains of AP 110 is busy.

By this means, it is possible to know how many more transmit chains can be used by other STAs 120 which will transmit the data signal to AP 110. Furthermore, by sharing the same (the same frequency) subcarriers in signature signal transmission and preamble signal transmission, it is possible to use more subcarriers in data signal transmission and improve channel utilization efficiency.

In addition, the transmission period of signature signal 151*a* and data signal 151 by STA 120-1 is not limited to period t2 and continues until the transmission of the data signal to be transmitted is completed.

The transmission of signature signal 151*a* using subcarrier 141 by STA 120-1 is continuously performed in the period data signal 151 is transmitted using subcarrier 140. By this means, it is possible to maintain the accuracy of processing such as channel estimation performed at AP 110 at a certain level. Furthermore, the transmission of data signal 151 and signature signal 151a is completed at the same time. By this means, other STAs 120 can detect that the data signal transmission by STA 120-1 is completed.

Assume that at a given time point there is a data signal to be transmitted at STA 120-3. STA 120-3 detects that medium 130 is busy according to a predetermined CSMA (Carrier Sense Multiple Access) algorithm. Here, STA 120-3 does not defer medium access but performs scanning to find available subcarrier groups.

In this case, STA 120-3 detects that the subcarrier group to which subcarrier 141 belongs is busy. In other words, STA 120-3 detects that the three subcarrier groups to which subcarriers 142, 143 and 144 belong are idle. Therefore, STA 120-3 selects two arbitrary subcarrier groups out of the three idle subcarrier groups. As a result, in this embodiment, group B and group D are selected. That is, one transmit chain (for example, antenna 121-31 and transmission/reception section 122-31) of STA 120-3 is associated with group B and another transmit chain (for example, antenna 121-32 and transmission/reception section 122-32) of STA 120-3 is associated with group D.

In period t3, STA 120-3 then transmits preamble signals 152 and 153 using four subcarriers 142 and 144. After the transmission of preamble signals 152 and 153 is completed, in period t4, STA 120-3 transmits data signals 154 and 155 using a plurality of subcarriers 145. In addition, subcarriers 145 used in transmission from STA 120-3 are multiplexed with subcarriers 140 used in transmission from STA 120-1 at the same frequency, at the same time. Furthermore, in period t4, STA 120-3 subsequently transmits signature signals 154a and 155a using four subcarriers 142 and 144. In addition, the transmission period of signature signals 154a and 155a, data signals 154 and 155 by STA 120-3 is not limited to period t4 and continues until the transmission of data signals 154 and 155 to be transmitted is completed.

At this time, channel response of each space channel from STA 120-1 and 120-3 is estimated at AP 110 so that individual subcarriers can be collectively demodulated and decoded, and, as a result, it is possible to regard a plurality of STAs 120 as one transmission apparatus and realize spatial multiplexing of channels.

Assume that at a give time point there is a data signal to be transmitted at STA 120-2. STA 120-2 detects that medium 130 is busy according to a predetermined CSMA algorithm. Here, STA 120-2 performs scanning to find idle subcarrier groups. In this case, STA 120-2 detects that the subcarrier group to which subcarrier 143 belongs is idle. Therefore, STA 120-2 is associated with group C which remains idle.

In period t5, STA 120-2 then transmits preamble signal 156 using two subcarriers 143. After the transmission of preamble signal 156 is completed, in period t6, STA 120-2 transmits data signal 157 using a plurality of subcarriers 146. In addition, subcarriers 146 used in transmission from STA 120-2 are multiplexed with subcarriers 140 and 145 used in transmission from STAs 120-1 and 120-3 at the same frequency, at the same time. Furthermore, in period t6, STA 120-2 subsequently transmits signature signal 157a using two subcarriers 143. In addition, the transmission period of signature signal 157a and data signal 157 by STA 120-2 is not limited to period t6 and continues until the transmission of data signal 157 to be transmitted is completed. At this time, channel response of each space channel from STAs 120-1, 120-2 and 120-3 is estimated at AP 110 so that individual subcarriers can be collectively demodulated and decoded.

In addition, in order to realize coexistence with conventional wireless communication apparatus sharing the same channel with STA 120 of this embodiment carrying out the above operation, STA 120 may prefix conventional preamble signal 158 based on, for example, IEEE802.11a, upon detecting that medium 130 is idle. By this means, legacy wireless communication apparatuses can readily detect the transmission start of STA 120 and defer medium access during predetermined transmission period 159. Furthermore, STA 120 may use one of preliminary fields in a conventional preamble signal and indicate that this transmission is based on new protocol. When the period defined by the SIGNAL field (for example, transmission period 159) is completed, legacy wireless communication apparatuses detect that medium 130 is busy by CCA (Clear Channel Assessment) and continue deferring medium access.

Furthermore, in the above operation, the signature signal is transmitted after the transmission of the preamble signal is completed, but the signature signal may be multiplexed with the preamble signal and transmitted at the same time. Further, when sequence codes of the signature signal and the preamble signal are made identical, it is possible to simplify the code generating processing and multiplexing processing at STA 120.

Furthermore, preamble signals 150, 152, 153, 156 and 158 may signal information related to, for example, the number of subcarrier groups in the OFDM band used until the next moment at which medium 130 becomes idle.

Furthermore, as a variation of the above explanation of operation, STA 120-3 may use diversity transmission technology such as, for example, Alamouti coding instead of using spatial multiplexing between two transmit chains to improve link reliability.

Figure 7:
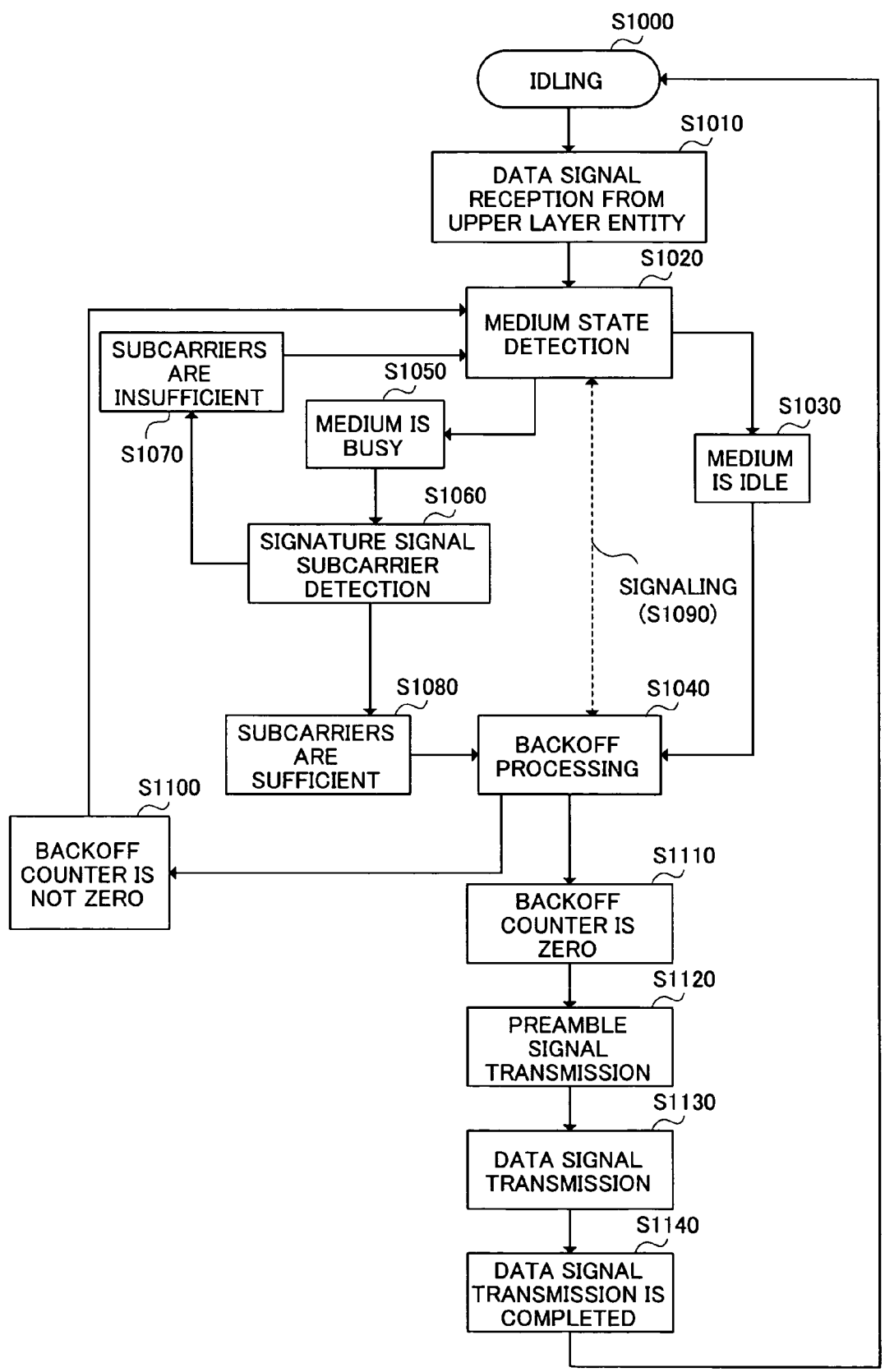
FIG. 7 illustrates the operation and state transition of the wireless transmission apparatus according to this embodiment.

Next, medium access control at STA 120 will be explained. FIG. 7 illustrates the operation and state transition at STA 120 of this embodiment.

First, as an initial state, STA 120 is in idling state (S1000). When the data signal is received from upper layer entity (S1010), the processing for detecting the state of medium 130 is performed (S1020). When it is detected that medium 130 is idle (S1030), a predetermined backoff processing is carried out (S1040). On the other hand, when it is detected in medium state detection processing (S1020) that medium 130 is busy (S1050), signature signal subcarrier detection is performed (S1060). At this signature signal subcarrier detection processing (S1060), by detecting idle subcarriers, the number of idle subcarrier groups, that is, the number of idle spatial channels can be determined.

When STA 120 determines that the number of idle subcarrier groups is insufficient for the number of transmit chains used in transmission (S1070), the operation returns to S1020. In this way, by deferring the data signal transmission, it is possible to avoid collisions of data signals at AP 110 and prevent deterioration of reception error rate characteristic. On the other hand, when STA 120 determines that the number of idle subcarrier groups is sufficient for the number of transmit chains used in transmission (S1080), the operation shifts to backoff processing (S1040).

This backoff processing (S1040) is basically similar to backoff processing by the conventional CSMA scheme—for example, backoff processing at DCF (Distributed Coordination Function)—but some modifications are reflected to implement features of the present invention. In backoff processing (S1040), a backoff counter (random backoff counter) is decremented every time it is detected that medium 130 is idle for at least a DIFS (Distributed Inter Frame Space) time.

By signaling (S1090) the backoff counter by medium state detection processing while medium 130 is idle, the backoff counter is decremented every slot time interval (per slot time). On the other hand, when the backoff processing (S1040)

starts as a result of the signature signal subcarrier detection processing (S1060), the unit of decrement intervals is switched from slot time unit to signature signal subcarrier detection time (that is, the time required for detecting the signature signal). In this case, it is not necessary to monitor the DIFS time that is a wait period before the backoff counter is decremented.

In this way, by switching the decrement time unit in the backoff processing according to the state of medium 130, it is possible to perform operation mode switching according to the state of medium 130. Particularly, when the signature signal has the characteristic making the time required for its detection longer than the slot time, it is possible to avoid the occurrence of collisions of data signals as a result of the backoff counter becoming zero before the detection time elapses once.

In backoff processing (S1040), while the backoff counter is not zero (S1100), STA 120 repeats the state for medium state detection processing (S1020) and the state for backoff processing (S1040). On the other hand, when the backoff counter becomes zero (S1110), STA 120 starts transmitting the preamble signal using subcarriers in idle subcarrier groups (S1120). In this way, by performing backoff processing before the transmission of the preamble signal, it is possible to more reliably avoid the occurrence of collisions with data signals transmitted from other STAs 120.

When the preamble signal transmission is completed, STA 120 starts transmitting the data signal (and the signature signal) (S1130). When the data signal transmission is completed (S1140), STA 120 returns to idle state (S1000).

Next, contention-based and poll-based medium access controls carried out in wireless LAN 100 of this embodiment will be explained.

Figure 8:
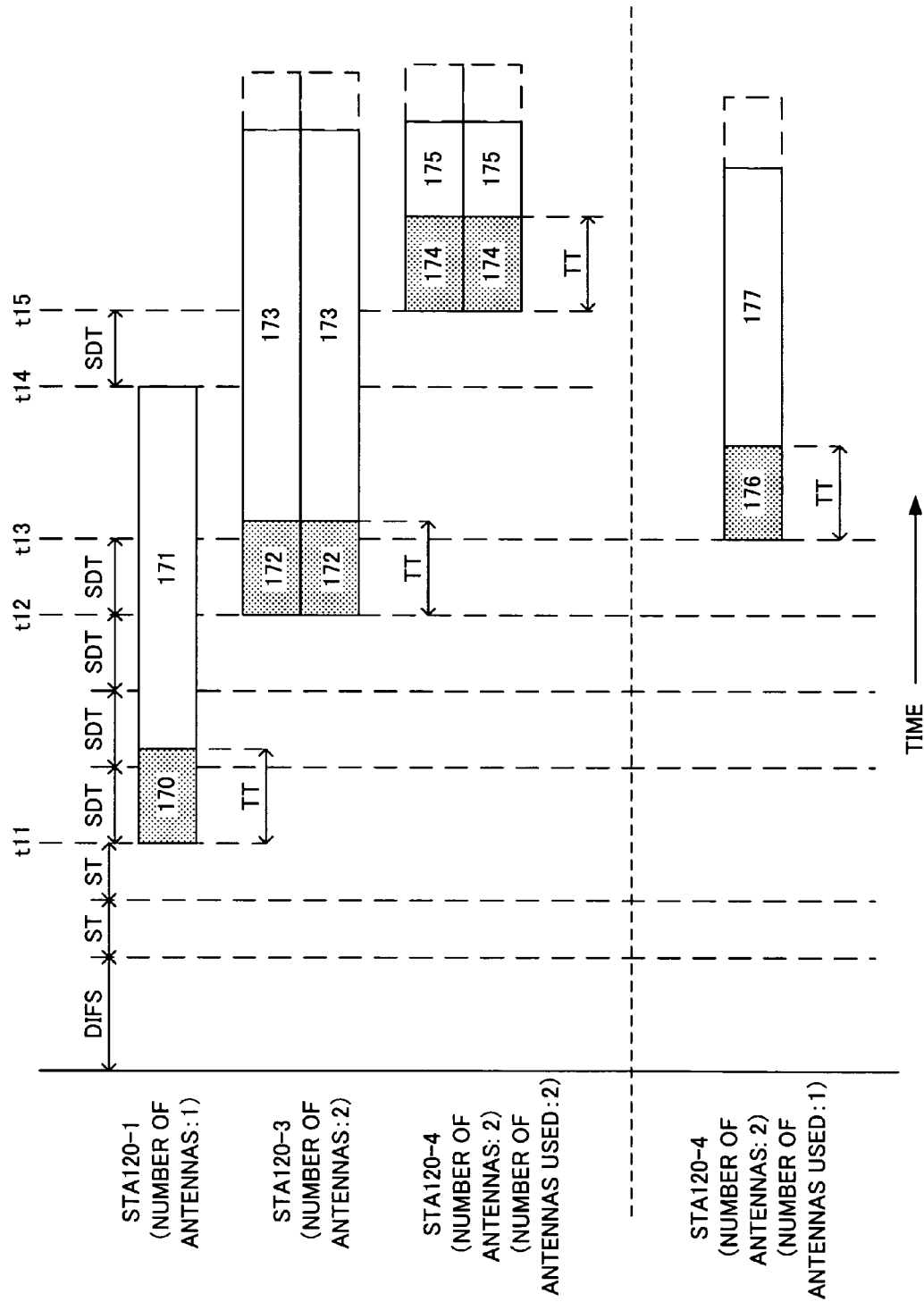
FIG. 8 illustrates a contention-based medium access control in the wireless LAN of this embodiment.

FIG. 8 illustrates contention-based medium access control in wireless LAN 100 of this embodiment. In addition, FIG. 8 covers the operation and state transition at STA 120 explained using FIG. 7. Furthermore, FIG. 8 shows an example of the operation timing of STAs 120-1, 120-3 and 120-4 which are in contention in data signal transmission to AP 110. Here, it is assumed that STAs 120-1, 120-3 and 120-4 select "2," "5" and "6" respectively for a random backoff counter.

When medium 130 is idle for a DIFS duration, STAs 120-1, 120-3 and 120-4 start decrementing the backoff counter. After two slot times (ST) elapse, that is, at the timing of time t11, the backoff counter of STA 120-1 is decremented to zero. STA 120-1 then starts transmitting preamble signal 170. Subsequently, data signal 171 and the signature signal are transmitted. Furthermore, at the timing of time t11, STAs 120-3 and 120-4 detect that medium 130 is busy. As a result, the decrement time unit in backoff processing at STAs 120-3 and 120-4 is switched from the slot time to the signature detection time (SDT).

After three signature detection times elapse, that is, at the timing of time t12, the backoff counter of STA 120-3 is decremented to zero. STA 120-3 then starts transmitting preamble signal 172. STA 120-3 has two transmit chains (antennas), and therefore uses, for example, two antennas 121-31 and 121-32 in transmission. Subsequently, data signal 173 and the signature signal are transmitted.

STA 120-4 having two transmit chains (antennas) detects that the number of available subcarriers for the signature signal is insufficient. That is because AP 110 has only four receive chains. In other words, the total number of transmit chains that can perform parallel transmission of data signals to AP 110 is maximum four. Therefore, medium access by STA 120-4 is deferred from time t12 and the transmission processing is also deferred.

Then, at the timing of time t14, STA 120-1 completes transmitting data signal 171 and the signature signal, and STA 120-4 then decrements the backoff counter. Then, at the timing of time t15, the backoff counter of STA 120-4 is decremented to zero. STA 120-4 then starts transmitting preamble signal 174. STA 120-4 has two transmit chains (antennas), and therefore uses, for example, two antennas 121-41 and 121-42 for transmission. Subsequently, data signal 175 and the signature signal are transmitted.

In addition, as for STA 120-4 performing medium access at the last, other access methods in place of the above method are possible. For example, at the timing of time t12, when it is detected that there is only one available space channel left, STA 120-4 may switch the operation mode so as to transmit using only one transmit chain. In this case, STA 120-4 can perform decrement also at time t12, and, at the timing of time t13, the backoff counter of STA 120-4 reaches zero. At this point, STA 120-4 transmits preamble signal 176 using, for example, only antenna 121-41. Subsequently, data signal 177 and the signature signal are transmitted.

In addition, in FIG. 8, note that the training time (TT) and signature detection time can be different. In this embodiment, since the signature signal and the preamble signal are the same, it is reasonably assumed that signature detection time is shorter than the training time, as shown in the figure.

Next, poll-based medium access control in wireless LAN 100 of this embodiment will be explained. Poll-based medium access control described here facilitates AP 110 in coordinating simultaneous medium access by a plurality of STAs 120, thereby reducing bandwidth overhead and facilitating power saving.

Polling frame (ConcurrentPoll) 180 used to coordinate simultaneous medium access indicates the duration for which STA 120 may access medium 130, the number of available transmit chains STA 120 may use, and the transmit mode of operation. Furthermore, polling frame 180 is transmitted by AP 110 in order to simultaneously grant bandwidth to a plurality of STAs 120. Polling frame 180 has, for example, the following frame configuration.

```
ConcurrentPoll
{
    {AddressSTA1, GrantDuration1, NoTx1, TxMode1}
    {AddressSTA2, GrantDuration2, NoTx2, TxMode2}
    .
    .
    .
    {AddressSTAN, GrantDurationN, NoTxN, TxModeN}
}
```

The AddressSTA field indicates the address of STA 120 that is being polled. The GrantDuration field indicates the time STA 120 may access medium 130. The NoTx field indicates the number of transmit chains to be used, and the TxMode field may be used by AP 110 to direct STA 120 to use a particular mode of transmission such as spatial multiplexing, diversity signaling or a combination of the two.

In order to maximize the utilization efficiency of medium 130, it is assumed that AP 110 employs the use of a scheduling entity that is able to maximize the duration for which all transmit chains are busy. Based on the structure above, this is equivalent to making the GrantDuration for all STAs 120 the same.

In this embodiment, a dedicated group of subcarriers are allocated to each transmit chain, but in the poll-based case, AP 110 may choose to explicitly perform allocation of subcarrier groups to different transmit chains. This may be achieved, for example, by adding a SignatureSubcarrier field to each row in the above frame configuration. By this means, STA 120 would know which signature subcarrier group to use. Furthermore, the information as to which subcarrier group to use can be implicitly assumed in the above frame configuration.

Figure 9:
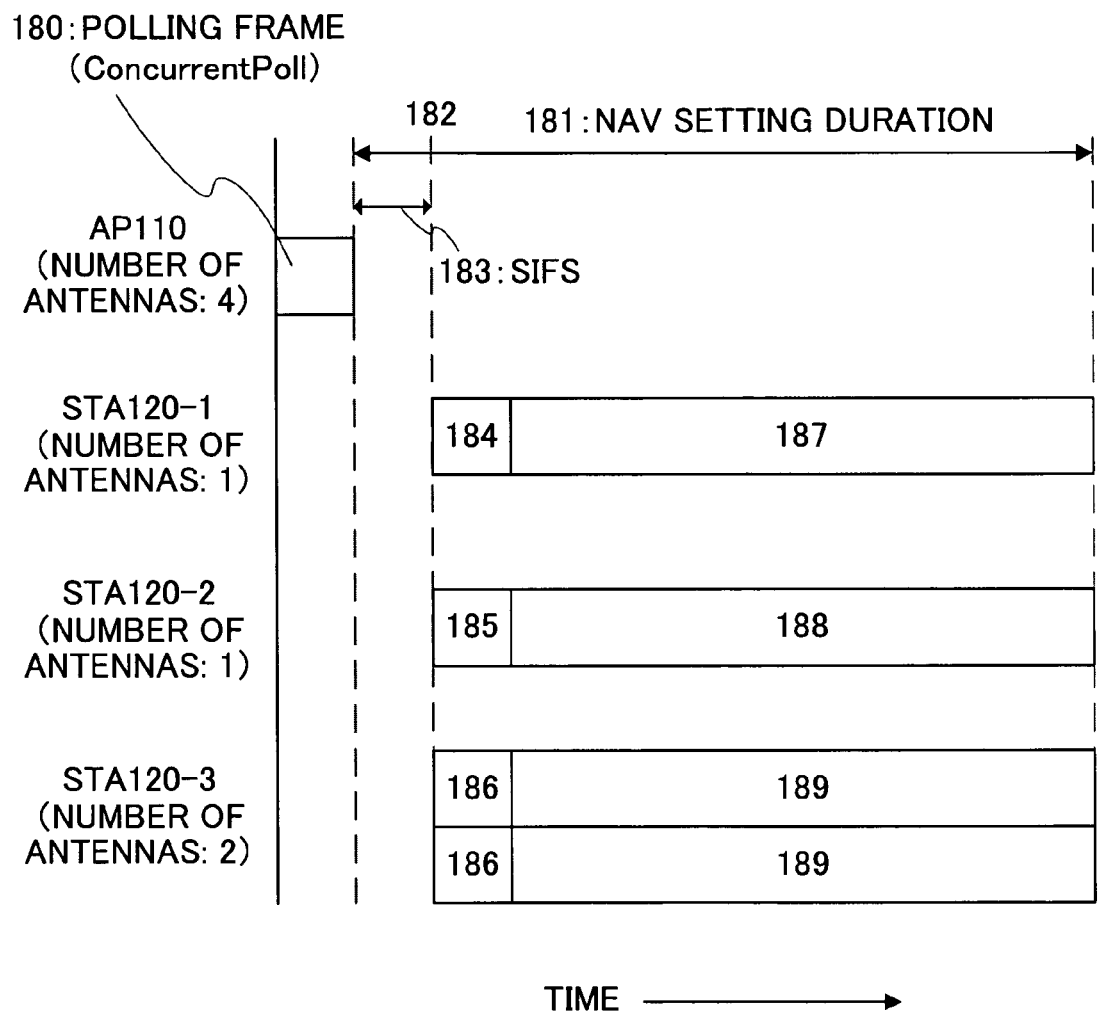
FIG. 9 illustrates a poll-based medium access control in the wireless LAN of this embodiment.

FIG. 9 illustrates poll-based medium access control in wireless LAN 100 of this embodiment.

First, polling frame 180 is polled, for example, from AP 110 to STAs 120-1, 120-2 and 120-3. For coexistence with legacy systems, a period (referred to as NAV setting period 181) equivalent to network allocation vector (NAV) may be set so as to prevent interference from other STAs 120 and data collisions. Furthermore, it is also possible to restrict access of conventional terminal apparatus by setting NAV.

After the transmission of polling frame 180 is completed and the period of SIFS (Short Inter Frame Space) 183 elapses, at the timing indicated by reference numeral 182, STA 120-1 starts transmitting preamble signal 184, STA 120-2 starts transmitting preamble signal 185, and STA 120-2 starts transmitting preamble signal 186. These transmissions start simultaneously. Subsequently, STA 120-1 transmits data signal 187 and the signature signal, STA 120-2 transmits data signal 188 and the signature signal, and STA 120-3 transmits data signal 189 and the signature signal.

As described above, according to this embodiment, the preamble signal is transmitted using a plurality of subcarriers 141, 142, 143 and 144 having frequencies different from each other, and the data signal is transmitted using subcarrier 140 having a frequency different from subcarriers 141, 142, 143 and 144, so that, even if STAs 120 are distributed and located in wireless LAN 100, it is still possible to maintain orthogonality between preamble signals in the time domain, and a plurality of STAs 120 can simultaneously transmit the data signal to AP 110, thereby improving throughput in wireless LAN 100.

Furthermore, according to this embodiment, when idle subcarriers are detected out of subcarriers 141, 142, 143, and 144, and the data signal is transmitted, the signature signal is transmitted using detected idle signature subcarriers so that the effect of maintaining orthogonality between preamble signals in the time domain can be reliably realized in poll-based medium access control and in contention-based medium access control.

Still further, according to this embodiment, since the number of subcarriers 141, 142, 143 and 144 corresponds to the total number of antennas that can perform parallel transmission of the data signal to AP 110, and at least one idle subcarrier is detected out of subcarriers 141, 142, 143 and 144, it is possible to know how many more antennas can be used for parallel transmission of the data signal to AP 110 at STA 120, and, with this, it is possible to perform parallel transmission of the data signal. Furthermore, according to this embodiment, in the state where some STA 120 has already transmitted the data signal to AP and still another STA 120 participates in the parallel transmission of the data signal, AP 110 can individually perform reception control processing.

Still further, according to this embodiment, subcarriers 141, 142, 143 and 144 each belong to one of a plurality of subcarrier groups, and the number of subcarrier groups is equal to the total number of antennas that can perform parallel transmission of the data signal to AP 110. Furthermore, idle subcarrier groups are detected out of a plurality of subcarrier groups, and the data signal is transmitted via an equal or smaller number of antennas than the idle subcarrier groups detected out of antennas 121-1 to 121-M$_T$. As a result, for example, in the case where the number of detected idle subcarrier groups is above the number of antennas of STAs 120, it is possible to transmit the data signal via all antennas. In the case where the number of detected idle subcarrier groups is less than the number of antennas of STAs 120, it is possible to transmit the data signal via the same number of antennas as the number of idle subcarrier groups.

Incidentally, wireless LAN 100 described in this embodiment has several applicable technical fields. That is, in companies/corporations, users may use wireless access-capable notebook computers at their desks and move these to meeting rooms and elsewhere. At home, an AP may be connected to a home AV server which may consist of a set top box, media player, and portal to the Internet, and devices equipped with wireless access functions such as display panels, cameras and notebook computers may be used to access the Internet or medium stored in the home AV server.

In addition, wireless LAN 100 according to this embodiment is applicable to cellular hotspots such as office building lobbies or coffee shops where STAs using data services may gain access.

EMBODIMENT 2

Figure 10:
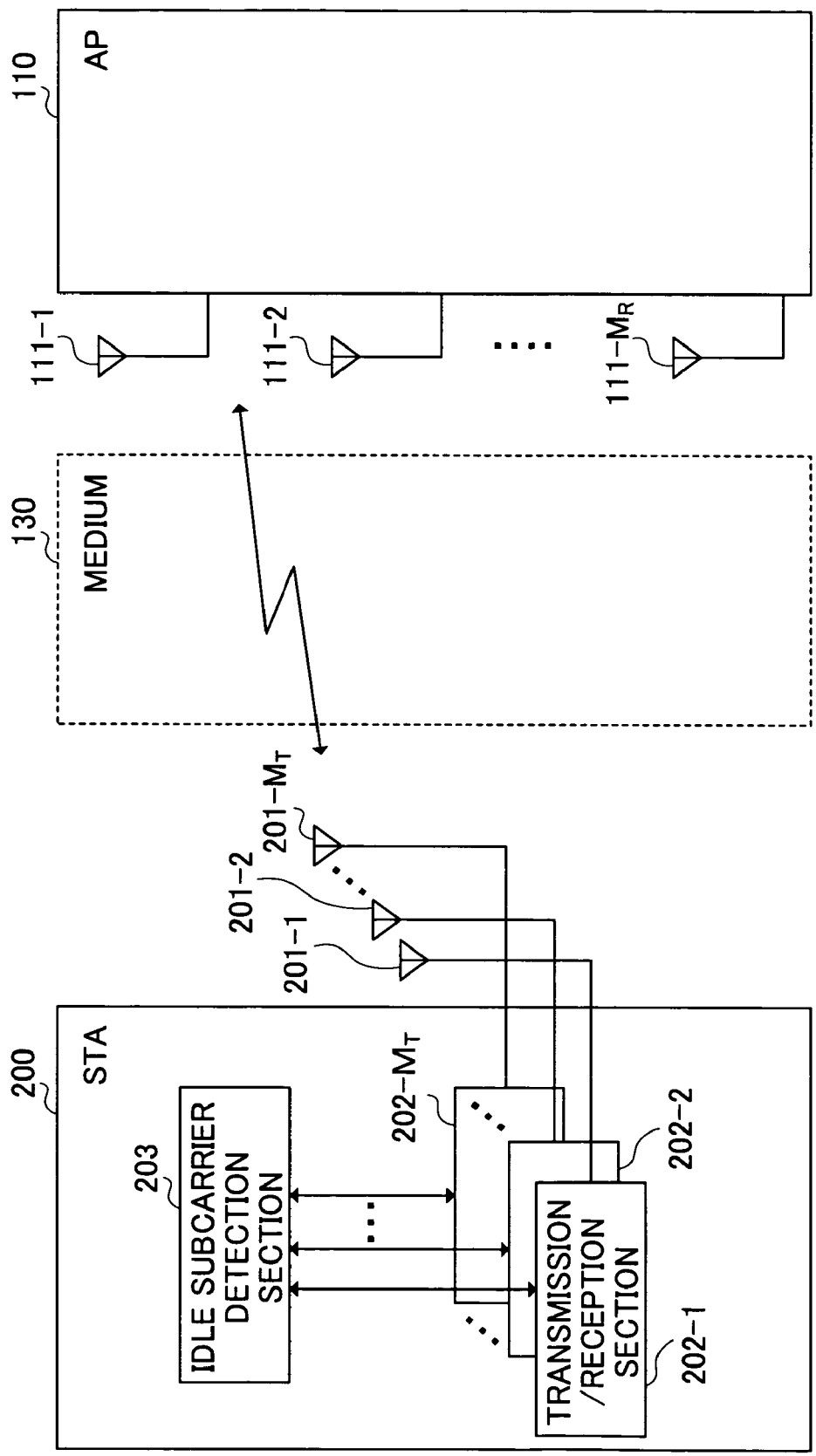
FIG. 10 is a block diagram showing an internal configuration of the wireless transmission apparatus according to Embodiment 2 of the present invention.

FIG. 10 is a block diagram showing a configuration of a mobile terminal apparatus (STA) adopting the wireless transmission apparatus according to Embodiment 2 of the present invention. In addition, STA 200 shown in FIG. 10 has basically the same configuration as STA 120 explained in Embodiment 1. Apparatus, components, and steps that are identical with ones described in Embodiment 1 will be assigned the same reference numerals as in Embodiment 1 without further explanations.

Furthermore, STA 200 can be used in wireless LAN 100 of a type having a centralized transmission/reception apparatus (AP110) and adhoc wireless LAN 100a, explained using FIG. 1 and FIG. 2. In addition, in this embodiment, the case where STA 200 is used in wireless LAN 100 shown in FIG. 1 will be explained as an example. Furthermore, as in the case of Embodiment 1, in this embodiment, N units of STAs 200-1 to 200-N which are distributed and located so that they can move in wireless LAN 100 are used. One or more arbitrary STA out of STAs 200-1 to 200-N is referred to as "STA 200."

N units of STAs 200-1 to 200-N each have M$_{TN}$ units of antennas 201-11 to 201-1M$_{T1}$, ..., 201-N1 to 201-NM$_{TN}$ that can simultaneously transmit signals independent from each other in the same frequency band. In addition, when STA 200 is referred to, antennas that STA 200 has are referred to as "antennas 201-1 to 201-M$_T$."

Furthermore, STA 200 has transmission/reception sections 202-1 to 202-M$_T$ that respectively correspond to M$_T$ units of antennas 201-1 to 201-M$_T$ and perform predetermined processing on a data signal inputted from upper layer entity and perform wireless transmission, and idle subcarrier detection section 203 that detects idle subcarriers in the communication frequency band used in wireless communication with AP 110 via medium 130. M$_T$ units of antennas 201-1 to 201-M$_T$ and transmission/reception sections 202-1 to 202-M$_T$ that respectively correspond to M$_T$ units of antennas 201-1 to 201-M$_T$ and perform predetermined processing on a data signal inputted from upper layer entity and perform wireless transmission, constitute M$_T$ units of transmit/receive chains. In addition, the detail of the operation of each component will be described later. Furthermore, in this embodiment, as in the case of Embodiment 1, the case where STA 200 implements functions as a wireless transmission apparatus and AP 110 implements functions as a wireless reception apparatus is focused and detailed description of the other cases is omitted.

Next, the operation in STA 200 having the above configuration will be explained.

Figure 11:
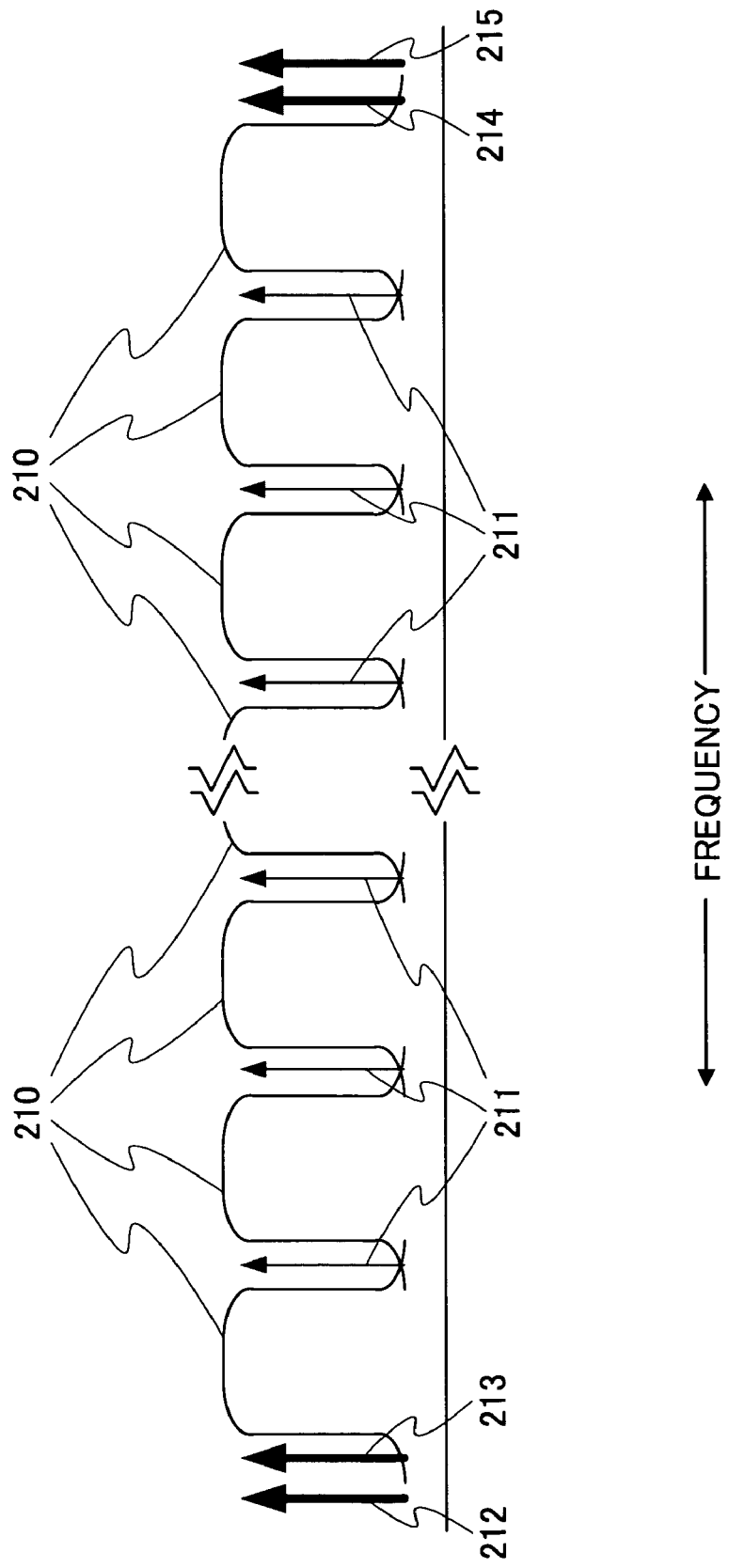
FIG. 11 illustrates frequency band allocation in the wireless LAN of this embodiment.

FIG. 11 illustrates frequency band allocation in wireless LAN 100 of this embodiment.

In order to implement wireless LAN 100 as a high-throughput wireless communication network system, it is necessary for a plurality of STAs 200 to perform access to medium 130 simultaneously and perform data transmission to AP 110 simultaneously in parallel. In order to perform parallel transmission of data signals to AP 110, it is essential to maintain orthogonality between preamble signals and between signature signals transmitted from STA 200 to AP 110 and overcome the problem of asynchronism.

As a method for achieving maintenance of orthogonality between signals, subcarriers are individually allocated to transmit chains performing data transmission to AP 110.

In the band allocation shown in FIG. 11, a plurality of subcarriers 211 that are available in preamble signal transmission are shared by all STAs 200. In this way, a plurality of subcarriers 211 dedicated for preamble signal transmission are shared by all STAs 200, thereby making it possible to maintain a certain accuracy in processing such as channel estimation at AP 110.

Furthermore, subcarriers that can be used in signature signal transmission are divided into a plurality of subcarrier groups. In this embodiment, it is assumed that AP 110 has four receive chains (antennas), and therefore it is possible to use four subcarriers 212, 213, 214 and 215 in signature signal transmission.

These subcarriers 211, 212, 213, 214 and 215 have frequencies different from each other. A plurality of subcarriers 210 dedicated for data signal transmission are located in bands between these subcarriers 211, 212, 213, 214 and 215. A plurality of subcarriers 210 constitute one subcarrier cluster. In this way, each frequency of subcarriers 211, 212, 213, 214 and 215 used in preamble signal transmission and signature signal transmission is distributed in frequency band used in wireless communication, thereby making it possible, for example, to improve accuracy of channel estimation at AP 110.

In addition, frequency band allocation, including the number of groups, the number of subcarriers per group and intervals between groups, is determined so as to be compatible with the bandwidth and dynamic state of a channel and capabilities of a transmission/reception apparatus. Furthermore, AP 110 may report the frequency band allocation to all STAs 200, for example, using a beacon, but in this embodiment, it is assumed that all STAs 200 have information of the frequency band allocation by certain methods in advance. In this embodiment, it is assumed that STA 200-1 has one transmit chain, STA 200-2 has one transmit chain, STA 200-3 has two transmit chains, STA 200-4 has two transmit chains, and AP 110 has four receive chains.

Figure 12:
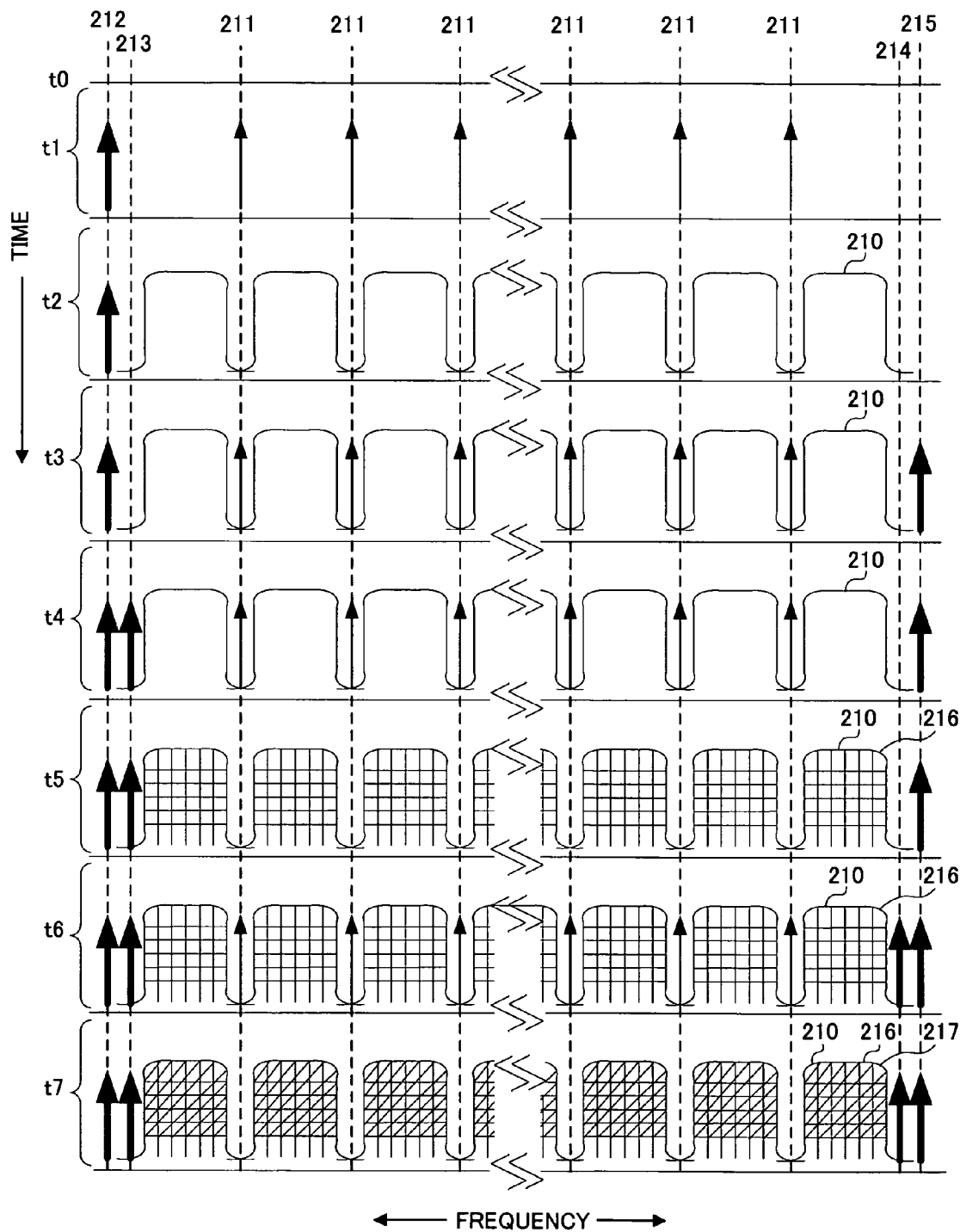
FIG. 12 is a diagram illustrating the operation of the wireless transmission apparatus according to this embodiment based on the frequency band allocation shown in FIG. 11, from the viewpoint of the frequency of subcarriers used.
Figure 13:
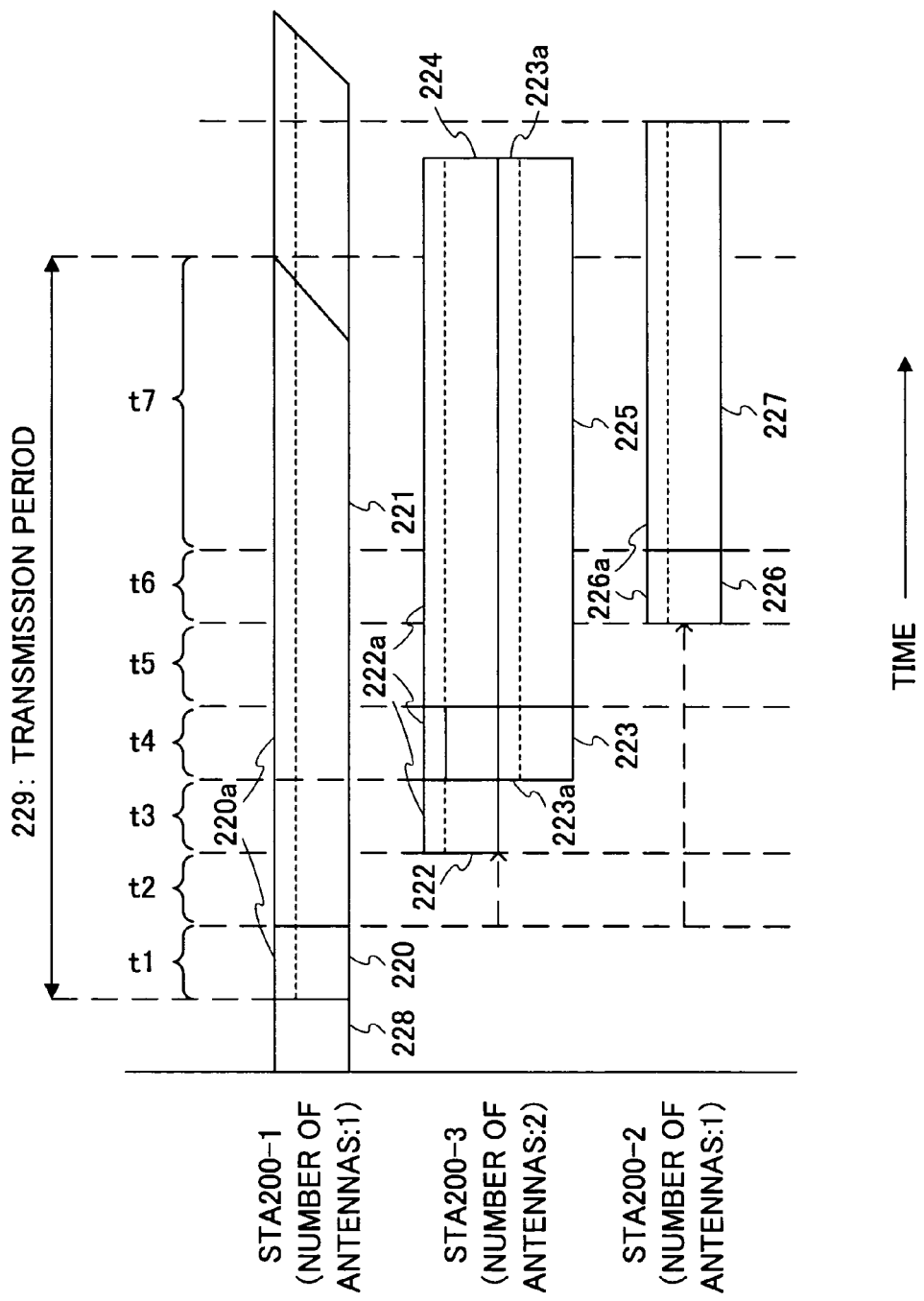
FIG. 13 is a diagram illustrating the operation of the wireless transmission apparatus according to this embodiment based on the frequency band allocation shown in FIG. 11, from the viewpoint of the time of subcarriers used.

FIG. 12 and FIG. 13 are diagrams illustrating the operation of STA 200 based on the frequency band allocation shown in FIG. 11. where FIG. 12 is a diagram illustrating the operation seen from the viewpoint of the frequency of subcarriers used and FIG. 13 is a diagram illustrating the operation seen from the viewpoint of the time subcarriers are used.

First, at time t0, when STA 200-1 confirms that medium 130 is idle, in period t1, STA 200-1 transmits preamble signal 220 using a plurality of subcarriers 211, and at the same time, transmits signature signal 220a using subcarrier 212. In this way, signature signal 220a and preamble signal 220 are transmitted simultaneously, thereby making it possible to report to other STAs 200 that the data signal transmission to AP 110 is scheduled.

After the transmission of preamble signal 220 is completed, in period t2, STA 200-1 transmits data signal 221 using a plurality of subcarriers 210. Furthermore, in period t2, STA 200-1 transmits signature signal 220a still using subcarrier 212. By this means, it is possible to indicate to other STAs 200 that subcarrier 212 is busy, that is, STA 200-1 transmits using one transmit chain, in other words, one of four available receive chains of AP 110 is busy.

By this means, other STAs 200 that will transmit the data signal to AP 110 can learn how many more transmit chains can be used.

In addition, the transmission period of signature signal 220a and data signal 221 by STA 200-1 is not limited to period t2, but continues until the transmission of data signal 221 to be transmitted is completed.

At a given point, assume that there is a data signal to be transmitted at STA 200-3. STA 200-3 detects that medium 130 is busy according to CSMA algorithm. Here, STA 200-3 does not defer medium access but performs scanning to find idle (available) subcarriers.

In this case, STA 200-3 detects that a plurality of subcarriers 211 are idle. Furthermore, STA 200-3 detects that subcarrier 212 is busy, that is, three subcarriers 213, 214 and 215 are idle. Therefore, STA 200-3 selects two arbitrary subcarriers out of the three idle subcarriers 213, 214 and 215. In this embodiment, it is assumed that subcarriers 213 and 215 are selected and the signature signal of STA 200-3 is transmitted using selected subcarriers 213 and 215.

Then, in period t3, STA 200-3 transmits preamble signal 222 from one transmit chain (for example, antenna 201-31) using a plurality of subcarriers 211, and at the same time, transmits signature signal 222a using subcarrier 215. After the transmission of preamble signal 222 is completed, in period t4, STA 200-3 transmits preamble signal 223 from another transmit chain (for example, antenna 201-32) using a plurality of subcarriers 211, at the same time, transmits signature signal 223a using subcarrier 213. At this time, the transmission of preamble signal 222a from antenna 201-31 is continued.

In this way, subcarrier 211 for the preamble signal transmission is used in time division per transmit chain, thereby making it possible to maintain orthogonality of preamble signals between transmit chains.

Then, in period t5, STA 200-3 transmits data signals 224 and 225 using a plurality of subcarriers 216. In addition, subcarriers 216 used in transmission from STA 200-3 are multiplexed with subcarriers 210 used in transmission from STA 200-1 at the same frequency, at the same time. Further, in period t5, STA 200-3 transmits signature signals 222a and 223a still using subcarriers 213 and 215. In addition, the transmission period of signature signals 222a and 223a and data signals 224 and 225 by STA 200-3 is not limited to period t5, but continues until the transmission of data signals 224 and 225 to be transmitted is completed. At this time, channel response of each space channel from STA 200-1 and 200-3 is estimated at AP 110 so that individual subcarriers can be collectively demodulated and decoded, and as a result, it is possible to regard a plurality of STAs 200 as one transmission apparatus and realize spatial multiplexing of channels.

Assume that at a give time point there is a data signal to be transmitted at STA 200-2. STA 200-2 detects that medium 130 is busy according to a predetermined CSMA algorithm. Here, STA 200-2 performs scanning to find idle subcarriers.

In this case, STA 200-2 detects that a plurality of subcarriers 211 are idle. Furthermore, STA 200-2 detects that subcarrier 214 is idle.

Then, in period t6, STA 200-2 transmits preamble signal 226 using a plurality of subcarriers 211, and at the same time, transmits signature signal 226a using subcarrier 214. After the transmission of preamble signal 226 is completed, in period t7, STA 200-2 transmits data signal 227 using a plurality of subcarriers 217. In addition, subcarrier 217 used in transmission from STA 200-2 is multiplexed with subcarriers 210 and 216 used in transmission from STA 200-1 and 200-3 at the same frequency, at the same time. Furthermore, in period t7, STA 200-2 subsequently transmits signature signal 226a using subcarrier 214. In addition, the transmission period of signature signal 226a and data signal 227 by STA 200-2 is not limited to period t7, but continues until the transmission of data signal 227 to be transmitted is completed. At this time, AP 110 estimates channel response of each space channel from STA 200-1, 200-2 and 200-3 so that individual subcarriers can be collectively demodulated and decoded.

In addition, in order to realize coexistence with legacy wireless communication apparatuses sharing the same channel with STA 200 of this embodiment carrying out the above operation, STA 200 may prefix conventional preamble signal 228 based on, for example, such as IEEE802.11a at the point of detecting that medium 130 is idle. By this means, legacy wireless communication apparatuses can readily detect the transmission start of STA 200 and defer medium access during predetermined transmission duration 229. Furthermore, STA 200 may use one of preliminary fields in a conventional preamble signal and indicate that this transmission is based on new protocol. At the point when the period specified by the SIGNAL field (for example, transmission duration 229) is completed, since legacy wireless communication apparatuses detect that medium 130 is busy by CCA (Clear Channel Assessment), medium access is continuously deferred.

Furthermore, preamble signal 211 may signal information related to the OFDM band used until the next moment at which medium 130 becomes idle (for example, the number of subcarriers for preamble signal transmission, the number of subcarriers for data signal transmission, the number of subcarriers for signature signal transmission and intervals between these subcarriers and so on).

Figure 14:
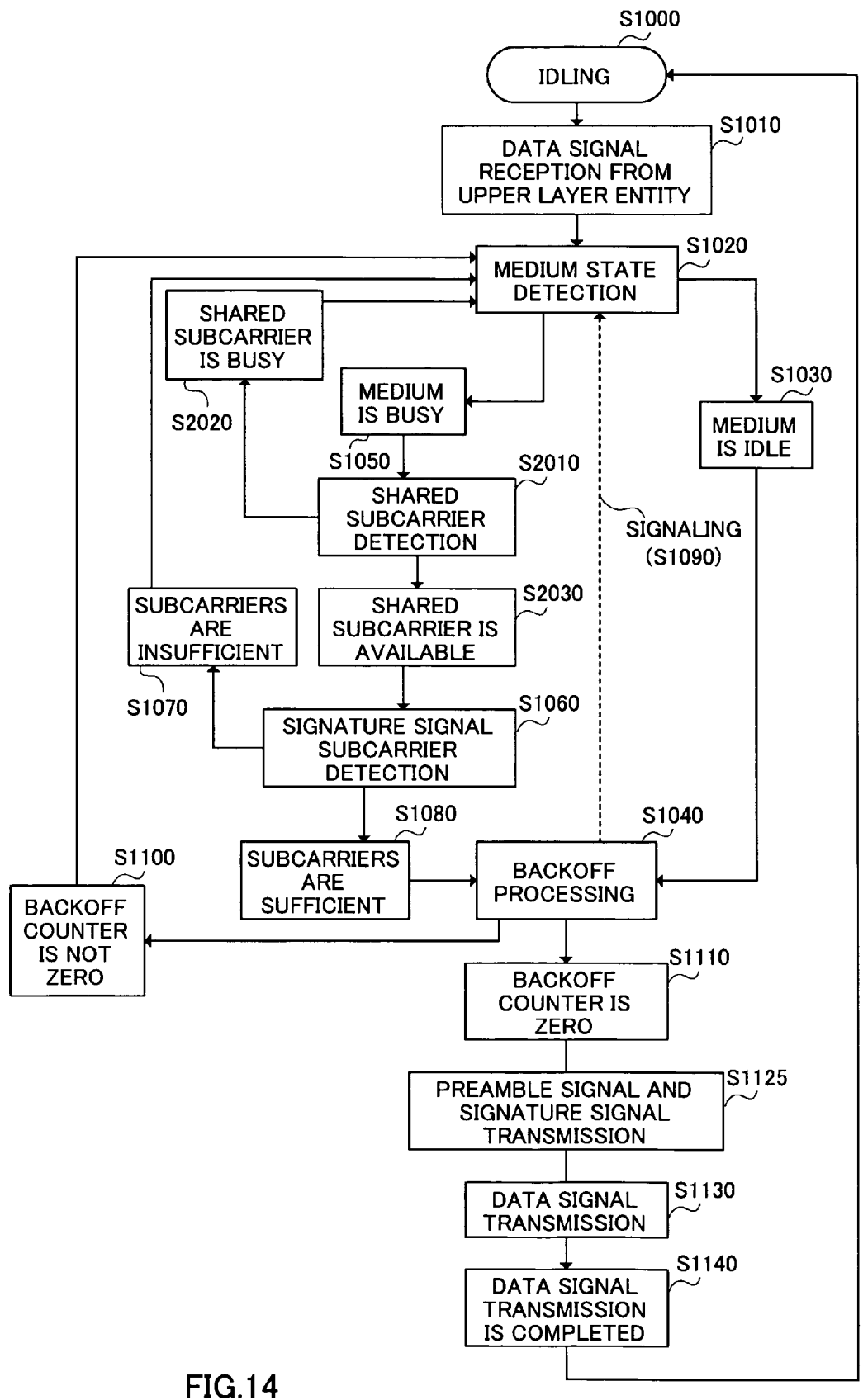
FIG. 14 illustrates the operation and state transition of the wireless transmission apparatus according to this embodiment.

Next, medium access control at STA 200 will be explained. FIG. 14 illustrates the operation and state transition at STA 200 of this embodiment.

In this embodiment, in the case where it is detected at medium state detection processing (S1020) that medium 130 is busy (S1050), detection is performed as to whether or not subcarriers shared between all STAs 200 for preamble signal transmission are busy (S2010). When it is detected that the shared subcarriers are busy (S2020), the operation returns to medium state detection processing (S1020). On the other hand, in the case where it is detected that the shared subcarriers are available, STA 200 proceeds to signature signal subcarrier detection processing (S1060).

Furthermore, in this embodiment, when a backoff counter becomes zero in backoff processing (S1040), STAs 200 start transmitting the preamble signal using shared subcarriers for preamble signal transmission, and start transmitting the signature signal using subcarriers for signature signal transmission (S1125).

Next, contention-based and poll-based medium access control carried out in wireless LAN 100 of this embodiment will be explained.

Figure 15:
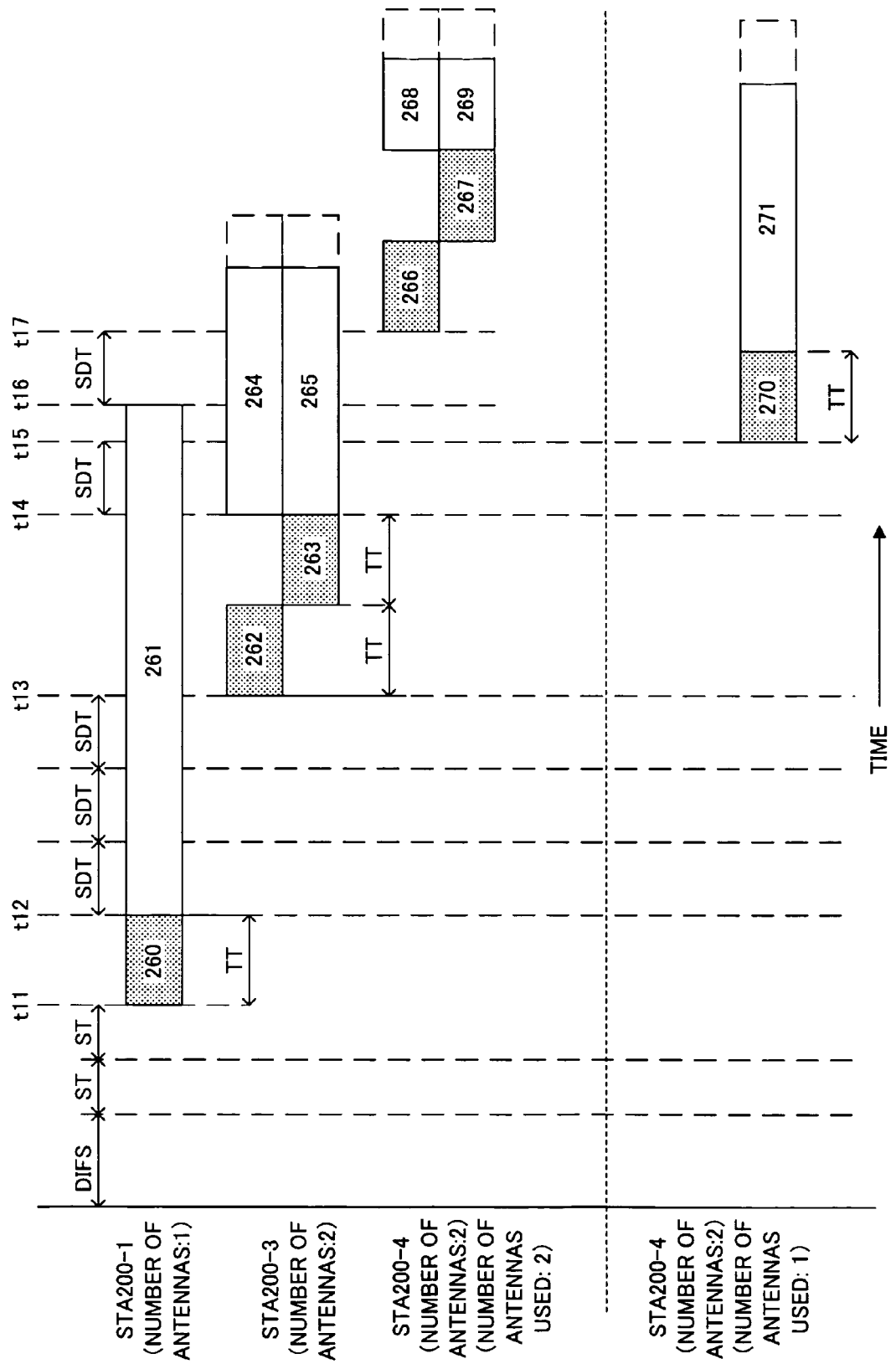
FIG. 15 illustrates a contention-based medium access control in the wireless LAN of this embodiment.

FIG. 15 illustrates contention-based medium access control in wireless LAN 100 of this embodiment. In addition, FIG. 15 covers the operation and state transition at STA 200 explained using FIG. 14. Furthermore, FIG. 15 shows an example of the operation timing of STAs 200-1, 200-3 and 200-4 which are in contention with data signal transmission to AP 110. Here, it is assumed that STA 200-1, 200-3 and 200-4 select "2," "5" and "6" respectively for a random backoff counter.

When medium 130 is idle for a DIFS period, STAs 200-1, 200-3 and 200-4 start decrementing the backoff counter. After two slot times (ST) elapse, that is, at the timing of time t11, the backoff counter of STA 200-1 is decremented to zero. STA 200-1 then starts transmitting preamble signal 260 and the signature signal. At the timing of time t12, transmission of preamble signal 260 is completed, and at the same time, transmission of data signal 261 starts. The signature signal transmission is continued.

On the other hand, at the timing of time t11, STAs 200-3 and 200-4 detect that medium 130 is busy. As a result, the decrement time unit in backoff processing at STAs 200-3 and 200-4 is switched from the slot time to the signature detection time (SDT).

After three signature detection times elapse, that is, at the timing of time t13, the backoff counter of STA 200-3 reaches zero. STA 200-3 then starts transmitting preamble signal 262 and the signature signal using one transmit chain (for example, antenna 201-31). After the transmission of preamble signal 262 is completed, STA 200-3 starts transmitting preamble signal 263 and the signature signal using another transmit chain (for example, antenna 201-32). Then, at the timing of time t14, the transmission of preamble signal 263 is completed, and STA 200-3 starts transmitting data signal 264 using antenna 201-31 and transmitting data signal 265 using antenna 201-32. The signature signal transmission from antennas 201-31 and 201-32 is continued.

STA 200-4 having two transmit chains (antennas) detects that the number of available signature signal subcarriers is insufficient. That is because AP 110 has only four receive chains. In other words, the total number of transmit chains that can perform parallel transmission of data signals to AP 110 is maximum four. Therefore, medium access by STA 200-4 is deferred from time t14 and the transmission processing is also deferred.

Then, at the timing of time t16, STA 200-1 completes transmitting data signal 261 and the signature signal, and then STA 200-4 decrements the backoff counter. At the timing of time t17, the backoff counter of STA 200-3 reaches zero.

STA 200-4 then starts transmitting preamble signal 266 and the signature signal using one transmit chain (for example, antenna 201-41). At the same time the transmission of preamble signal 266 is completed, STA 200-4 starts transmitting preamble signal 267 and the signature signal using another transmit chain (for example, antenna 201-42). Then, when the transmission of preamble signal 267 is completed, STA 200-4 starts transmitting data signal 268 using antenna 201-41 and transmitting data signal 269 using antenna 201-42. The signature signal transmission from antenna 201-41 and 201-42 is continued.

In addition, as for STA 200-4 performing medium access at the last, other access methods in place of the above method are possible. For example, at the timing of time t14, when it is detected that there is only one available space channel left, STA 200-4 may switch the operation mode so as to transmit using only one transmit chain. In this case, STA 200-4 can perform the decrementing also at time t14, and, at the timing of time t15, the backoff counter of STA 200-4 reaches zero. At this point, STA 200-4 transmits preamble signal 270 and the signature signal using, for example, only antenna 201-41. Subsequently, data signal 271 and the signature signal are transmitted.

Next, poll-based medium access control in wireless LAN 100 of this embodiment will be explained. Polling frame 280 which will be explained here has substantially the same frame configuration as polling frame 180 described in Embodiment 1, and therefore the detailed explanation thereof will be omitted.

In this embodiment, dedicated subcarriers are allocated to each transmit chain, but in the poll-based case, AP 110 may explicitly allot subcarrier to different transmit chains. This may be achieved, for example, by adding a SignatureSubcarrier field to each row of the frame configuration of polling frame 280, using which STA 200 would know which signature subcarriers to use for the signature signal transmission. Furthermore, the information as to which subcarriers to use can be implicitly assumed in the above frame configuration.

Figure 16:
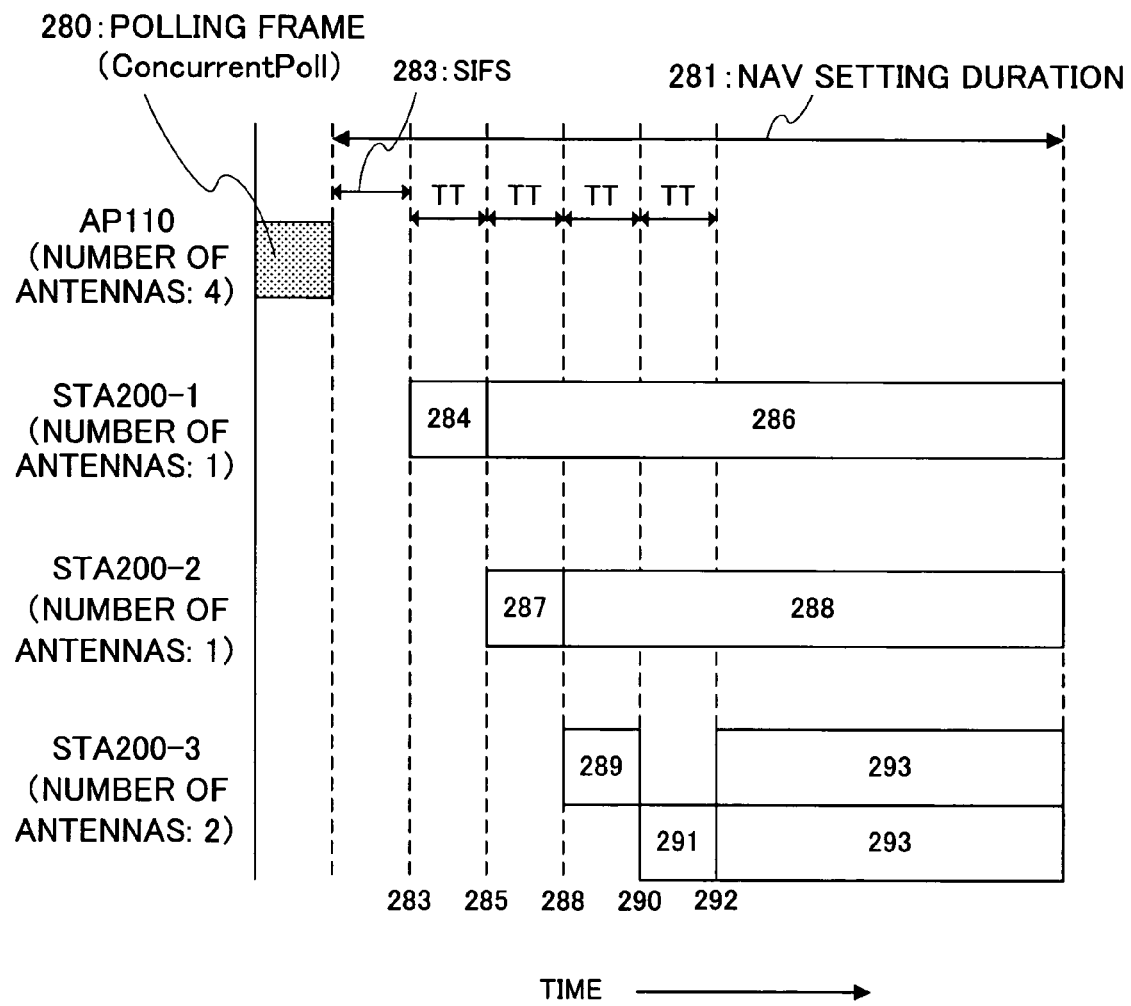
FIG. 16 illustrates a poll-based medium access control in the wireless LAN of this embodiment.

FIG. 16 illustrates poll-based medium access control in wireless LAN 100 of this embodiment.

First, polling frame 280 is polled, for example, from AP 110 to STAs 200-1, 200-2 and 200-3. For coexistence with legacy systems, a period (referred to as NAV setting period 281) equivalent to network allocation vector (NAV) may be set so as to prevent interference from other STAs 200 and data collisions.

In this embodiment, after the transmission of polling frame 280 is completed and the duration of SIFS 282 elapses, at the timing indicated by reference numeral 283, STA 200-1 starts transmitting preamble signal 284 and the signature signal.

Then, after a training time (TT) is completed, at the timing indicated by reference numeral 285, STA 200-1 completes transmitting preamble signal 284, and at the same time, starts transmitting data signal 286. Furthermore, at the same time, STA 200-2 starts transmitting preamble signal 287 and the signature signal. In addition, the training time can be implemented, for example, as a constant at the MIB (Management Information Base) of a network node.

Then, at the timing indicated by reference numeral 288, STA 200-2 completes transmitting preamble signal 287, and at the same time, starts transmitting data signal 288. Furthermore, at the same time, STA 200-3 starts transmitting preamble signal 289 and the signature signal using a first transmit chain.

Then, at the timing indicated by reference numeral 290, STA 200-3 completes transmitting preamble signal 287 using the first transmit chain, and starts transmitting preamble signal 291 and the signature signal using a second transmit chain. Then, at the timing indicated by reference numeral 292, STA 200-3 completes transmitting preamble signal 291 using the second transmit chain, and starts transmitting data signal 293 using the first transmit chain and the second transmit chain.

As described above, according to this embodiment, the number of subcarriers 212, 213, 214 and 215 is equal to the total number of antennas that can perform parallel transmission of the data signal to AP 110. Furthermore, idle subcarriers are detected out of subcarriers 212, 213, 214 and 215, and the data signal is transmitted via antennas of an equal or smaller number of the idle subcarriers detected out of antennas 201-1 to 201-$M_T$. As a result, for example, in the case where the number of detected idle subcarriers is above the number of antennas of STAs 200, it is possible to transmit the data signal via all antennas. In the case where the number of detected idle subcarriers is less than the number of antennas of STAs 200, it is possible to transmit the data signal via the same number of antennas as the number of idle subcarriers.

The present application is based on Japanese Patent Application No. 2003-433897, filed on Dec. 26, 2003, the entire content of which is expressly incorporated by reference herein.

INDUSTRIAL APPLICABILITY

The wireless transmission apparatus and wireless transmission method according to the present invention has the effect of improving throughput in wireless communication network, and is useful in a wireless communication network system such as, for example, wireless LAN.

The invention claimed is:

1. A wireless transmission apparatus comprising:
   at least one transmission antenna;
   a transmission section that transmits a preamble signal and a data signal via the at least one transmission antenna; and
   a detection section that detects an idle signature subcarrier out of a plurality of signature subcarriers that are used to transmit a signature signal and have frequencies different from a data subcarrier, wherein:
   the transmission section uses a preamble subcarrier allocated per transmission antenna to transmit the preamble signal and uses the data subcarrier having a frequency different from each preamble subcarrier to transmit the data signal,
   when transmitting the data signal, the transmission section transmits the signature signal using the detected idle signature subcarrier, and
   the number of the plurality of signature subcarriers corresponds to the total number of transmission antennas that can transmit the data signal in parallel to a wireless reception apparatus to which the data signal is addressed.

2. The wireless transmission apparatus according to claim 1, wherein the transmission section completes transmitting the signature signal when completing transmitting the data signal.

3. The wireless transmission apparatus according to claim 1, wherein the transmission section continues transmitting the signature signal during a period the data signal is transmitted.

4. The wireless transmission apparatus according to claim 1, wherein the transmission section defers transmitting the data signal when an insufficient number of idle signature subcarriers are detected.

5. A wireless communication network system comprising the wireless transmission apparatus according of claim 1.

6. The wireless transmission apparatus according to claim 1, wherein:
   the plurality of signature subcarriers each belong to one of a plurality of subcarrier groups, the number of the plurality of subcarrier groups being equal to or less than the total number of the transmission antennas;
   the transmission antenna comprises a plurality of transmission antennas;
   the detection section detects at least one idle subcarrier group out of the plurality of subcarrier groups; and
   the transmission section transmits the data signals via an equal or smaller number of transmission antennas than the at least one idle subcarrier group detected, out of the plurality of transmission antennas.

7. The wireless transmission apparatus according to claim 6, wherein the transmission section transmits the signature signal using signature subcarriers belonging to a same number of subcarrier groups as the transmission antennas used to transmit the data signal.

8. The wireless transmission apparatus according to claim 1, wherein:
the number of the plurality of signature subcarriers is equal to or less than the total number of the transmission antennas;
the transmission antenna comprises a plurality of transmission antennas;
the detection section detects at least one idle signature subcarrier out of the plurality of signature subcarriers; and
the transmission section transmits the data signal via an equal or smaller number of transmission antennas than the at least one signature subcarrier detected.

9. The wireless transmission apparatus according to claim 8, wherein the transmission section starts transmitting the signature signal when starting transmitting the preamble signal.

10. The wireless transmission apparatus according to claim 8, wherein the transmission section transmits the signature signal using the same number of signature subcarriers as the transmission antennas used to transmit the data signal.

11. The wireless transmission apparatus according to claim 1, wherein the transmission section transmits the preamble signal before transmitting the data signal.

12. The wireless transmission apparatus according to claim 11, wherein the transmission section transmits the preamble signal using a preamble subcarrier having the same frequency as the idle signature subcarrier detected.

13. The wireless transmission apparatus according to claim 11, wherein:
the detection section detects a usage state of the preamble subcarrier; and
the transmission section transmits the preamble signal when the preamble subcarrier is detected to be idle.

14. The wireless transmission apparatus according to claim 11, wherein, when the detection section detects an idle signature subcarrier, the transmission section performs predetermined backoff processing before transmitting the preamble signal.

15. The wireless transmission apparatus according to claim 14, further comprising a determination section that determines a state of medium communicating to the wireless reception apparatus the data signal transmitted by the transmission section,
wherein the transmission section switches a decrement time unit of in backoff processing according to the state of the medium determined.

16. A wireless transmission method comprising:
a transmission step of transmitting a preamble signal and a data signal via at least one transmission antenna, wherein the transmission step comprises:
a preamble transmission step of transmitting the preamble signal using a preamble subcarrier allocated per transmission antenna; and
a data transmission step of transmitting the data signal using a data subcarrier having a frequency different from each preamble subcarrier; and
a detection step of detecting an idle signature subcarrier out of a plurality of signature subcarriers that are used to transmit a signature signal and have frequencies different from the data subcarrier, wherein:
when transmitting the data signal, the transmission step transmits the signature signal using the detected idle signature subcarrier, and
the number of the plurality of signature subcarriers corresponds to the total number of transmission antennas that can transmit the data signal in parallel to a wireless reception apparatus to which the data signal is addressed.

* * * * *